(12) United States Patent
Gandhi et al.

(10) Patent No.: US 10,326,322 B2
(45) Date of Patent: Jun. 18, 2019

(54) DOUBLE-ROTOR FLUX-SWITCHING MACHINE

(71) Applicant: RENSSELAER POLYTECHNIC INSTITUTE, Troy, NY (US)

(72) Inventors: Arun Gandhi, Troy, NY (US); Leila Parsa, Green Island, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 279 days.

(21) Appl. No.: 13/970,199

(22) Filed: Aug. 19, 2013

(65) Prior Publication Data

US 2014/0049124 A1    Feb. 20, 2014

Related U.S. Application Data

(60) Provisional application No. 61/684,853, filed on Aug. 20, 2012.

(51) Int. Cl.
*H02K 21/44* (2006.01)
*H02K 1/17* (2006.01)
(Continued)

(52) U.S. Cl.
CPC .............. *H02K 1/246* (2013.01); *H02K 15/03* (2013.01); *H02K 16/02* (2013.01); *H02K 21/44* (2013.01);
(Continued)

(58) Field of Classification Search
CPC ........ H02K 1/246; H02K 21/44; H02K 16/02; H02K 15/03; H02K 1/17; H02K 21/04;
(Continued)

(56) References Cited

U.S. PATENT DOCUMENTS 4,777,397 A * 10/1988 Parshall .................. 310/156.15
7,615,905 B2 * 11/2009 Rolando Avila Cusicanqui .........
  H02K 21/44
  310/166
(Continued)

FOREIGN PATENT DOCUMENTS

CN   201868960 U  *  6/2011
CN   202210713 U  *  5/2012
(Continued)

OTHER PUBLICATIONS

Qu (Dual-Rotor, Radial-Flux, Toroidally Wound, Permanent-Magnet Machines).*
(Continued)

*Primary Examiner* — Thomas Truong
*Assistant Examiner* — Alexander Moraza
(74) *Attorney, Agent, or Firm* — Murtha Cullina LLP; Anthony P. Gangemi

(57) ABSTRACT

Advantageous machines, such as flux-switching machines (FSMs) are provided. An FSM can be yokeless and can have two rotors, which can be displaced from one another (e.g., by half a pole pitch). An FSM can be a flux-switching permanent magnet machine (FSPMM), and all magnets can be magnetized in the same circumferential direction. FSMs of the subject invention are cost-effective, have high torque density, and can operate well even under fault conditions.

18 Claims, 14 Drawing Sheets

(51) Int. Cl.

| | | |
|---|---|---|
| H02K 21/04 | (2006.01) | |
| H02K 16/02 | (2006.01) | |
| H02K 1/24 | (2006.01) | |
| H02K 15/03 | (2006.01) | |

(52) U.S. Cl.
CPC .............. *H02K 1/17* (2013.01); *H02K 21/04* (2013.01); *Y02E 10/725* (2013.01); *Y10T 29/49012* (2015.01)

(58) Field of Classification Search
CPC .. H02K 19/12; H02K 19/26; Y10T 29/49012; Y02E 10/725
USPC ............. 310/46, 154.33, 154.28, 114, 49.46, 310/49.28, 154.36, 179, 180, 181, 190, 310/199, 209, 210, 154, 154.02
See application file for complete search history.

(56) References Cited

U.S. PATENT DOCUMENTS

| | | | |
|---|---|---|---|
| 2005/0179337 A1* | 8/2005 | Hasebe et al. ................. | 310/268 |
| 2005/0201520 A1* | 9/2005 | Smith et al. ................... | 378/131 |
| 2006/0131985 A1 | 6/2006 | Qu et al. | |
| 2006/0175923 A1* | 8/2006 | Abou Akar et al. ........... | 310/114 |
| 2008/0218015 A1* | 9/2008 | Weeber et al. ................. | 310/86 |
| 2009/0140526 A1* | 6/2009 | Jansen ...................... | H02K 1/14 290/55 |
| 2009/0160391 A1* | 6/2009 | Flynn ...................... | H02K 21/44 318/701 |
| 2010/0285702 A1* | 11/2010 | Platon .................... | H02K 16/04 440/6 |
| 2011/0248507 A1* | 10/2011 | Petersen et al. ................ | 290/55 |
| 2012/0187794 A1* | 7/2012 | Inoue et al. ................... | 310/181 |
| 2013/0069469 A1* | 3/2013 | Kodani et al. ............ | 310/156.38 |
| 2013/0113318 A1* | 5/2013 | Nishiyama ............. | H02K 21/44 310/114 |
| 2013/0257188 A1* | 10/2013 | Raminosoa et al. ............ | 310/46 |
| 2014/0300217 A1* | 10/2014 | Lim ....................... | H02K 16/00 310/43 |

FOREIGN PATENT DOCUMENTS

| | | | |
|---|---|---|---|
| JP | 2001037189 A | * | 2/2001 |
| JP | 2007159282 A | * | 6/2007 |
| WO | WO 2002/015229 | | 2/2002 |

OTHER PUBLICATIONS

Toliyat (Handbook of Electric Motors).*
Woolmer (Analysis of the yokeless and segmented armature machine).*
CN202210713U English Translation.*
CN 201868960 U (English Translation).*
JP 2007159282 A (English Translation).*
JP-2001037189-A (English Translation) (Year: 2001).*
Bassham, B., "An Evaluation of Electric Motors for Ship Propulsion," 2002, *M.S. Thesis, Naval Post-Graduate School*, United States Navy, BEE, Auburn University.
Bianchi N et al., "Strategies for the fault-tolerant current control of a five-phase permanent-magnet motor," IEEE Transactions on Industry Applications, Jul./Aug. 2007, vol. 43 (4): 960-970.
Chen Y et al., "Starting torque of single-phase flux-switching permanent magnet motors," IEEE Transactions on Magnetics, Oct. 2006, vol. 42 (10): 3416-3418.
Chryssostomidis, C. et al., "Quarterly Report on the Contributions from MIT to the Electric Ship Research and Development Consortium," 2008, Report submitted by MIT to Office of Naval Research.
Dwari S et al., "An optimal control technique for multiphase PM machines under open-circuit faults," IEEE Transactions for Industrial Electronics, May 2008, vol. 55 (5): 1988-1995.
Gandhi A et al., "Double-sided FRLSN for long-stroke safety-critical applications," IECON 2011—37th Annual Conference on IEEE Industrial Electronics Society, Nov. 2011, p. 4186-4191.
Gandhi A. et al., "Flux-Switching Linear Permanent Magnet Machine with Yokeless Translator," U.S. Patent Application, filed Jan. 4, 2013, U.S. Appl. No. 13/734,404.
Gurol H, "General atomics linear motor applications: Moving towards deployment," Proceedings of the IEEE, Nov. 2009, vol. 97 (11): 1864-1871.
Hodgins N et al., "Design and testing of a linear generator for wave-energy applications," IEEE Transactions on Industrial Electronics, May 2012, vol. 59 (5): 2094-2103.
Hua W et al., "Analysis and optimization of back EMF waveform of a flux-switching permanent magnet motor," IEEE Transactions on Energy Conversion, Sep. 2008, vol. 23 (3): 727-733.
Hwang C et al., "Optimal design of a permanent magnet linear synchronous motor with low cogging force," IEEE Transactions on Magnetics, Feb. 2012, vol. 48 (2): 1039-1042.
Isfahani A et al., "Design optimization of a low-speed sing-sided linear induction motor for improved efficiency and power factor," IEEE Transactions on Magnetics, Feb. 2008, vol. 44 (2): 266-272.
Jin M et al., "A modular permanent-magnet flux-switching linear machine with fault-tolerant capability," IEEE Transactions on Magnetics, Aug. 2009, vol. 45 (8): 3179-3186.
Krop D et al., "Analysis of a novel double sided flux switching linear motor topology," XIX International Conference on Electrical Machines, Sep. 2010, p. 1-5.
Lateb, R. et al., "Performance Comparison of Induction Motors and Surface Mounted PM Motor for POD Marine Propulsion," 2005, *Industry Applications Conference—40th IAS Annual Meeting*, vol. 2, p. 1342-1349.
Lee B.-H. et al., "Optimum shape design of single-sided linear induction motors using response surface methodology and finite-element method," IEEE Transactions on Magnetics, Oct. 2011, vol. 47 (10): 3657-3660.
Lim H et al., "Ropeless elevator with linear switched reluctance motor drive actuation systems," IEEE Transactions on Industrial Electronics, Aug. 2007, vol. 54 (4): 2209-2218.
Min, W. et al., Optimization and Comparison of Novel E-Core and C-Core Linear Switched Flux PM Machines, 2011, *Magnetics*, vol. 47, No. 8, p. 2134-2141.
Mirzaei M et al., "A large linear interior permanent magnet motor for electromagnetic launcher," IEEE Transactions on Electromagnetic Launcher, Jun. 2011, vol. 39 (6): 1566-1570.
Patel, M., "Chapter 8: Propulsion Motors," in *Shipboard Propulsion, Power Electronics, and Ocean Energy*, CRC Press, 2012, p. 209-224.
Rhinefrank K et al., "Comparison of direct-drive takeoff systems for ocean wave energy applications," IEEE Journal of Oceanic Engineering, Jan. 2012, vol. 37 (1): 35-44.
Thompson M, "Practical issues in the use of NdFeB permanent magnets in maglev, motors, bearings, and eddy current brakes," Proceedings of the IEEE, Nov. 2009, vol. 97 (11): 1758-1767.
Vaez-Zadeh S et al., "Multiobjective design optimization of air-core linear permanent-magnet synchronous motors for improved thrust and low magnet consumption," IEEE Transactions on Magnetics, Mar. 2006, vol. 42 (3): 446-452.
Vermaak R et al., "Design aspects of a novel topology air-cored permanent magnet linear generator for direct drive wave energy converters," IEEE Transactions on Industrial Electronics, May 2012, vol. 59 (5): 2104-2115.
Wang H et al., "A genetic algorithm combined with finite element method for robust design of actuators," IEEE Transactions on Magnetics, Jul. 2000, vol. 36 (4): 1128-1131.
Wang J et al., "Comparative studies on linear motor topologies for reciprocating vapor compressors," IEEE International Electric Machines Drives Conference, 2007, May 2007, vol. 1: 364-369.
Wang J et al., "A tubular flux-switching permanent magnet machine," Journal of Applied Physics, Apr. 2008, vol. 103 (7):07F105-07F105-3.
Woolmer T et al., "Analysis of the yolkless and segmented armature machine," IEEE International Electric Machines Drives Conference, 2007, May 2007, vol. 1: 704-708.

(56) References Cited

OTHER PUBLICATIONS

Zhao W et al, "Remedial injected-harmonic-current operation of redundant flux-switching permanent-magnet motor drives," IEEE Transactions on Industrial Electronics, Jan. 2013, vol. 60(1): 151-159.

Zheng P et al., "Investigation of a novel five-phase modular permanent-magnet in-wheel motor," IEEE Transactions on Magnetics, Oct. 2011, vol. 47(10): 4084-4087.

Zhou G et al., "Analysis method to a halbach PM ironless linear motor with trapezoid windings," IEEE Transactions on Magnetics, Oct. 2011, vol. 47 (10): 4167-4170.

Zhu Z et al., "Analysis of electromagnetic performance of flux-switching permanent-magnet machines by nonlinear adaptive lumped parameter magnetic circuit model," IEEE Transactions on Magnetics, Nov. 2005, vol. 41 (11): 4277-4287.

Zhu Z et al., "Novel linear flux-switching permanent magnet machines," International Conference on Electrical Machines and Systems, 2008, Oct. 2008, p. 2948-2953.

Zhu Z et al., "Advanced flux-switching permanent magnet brushless machines," IEEE Transactions on Magnetics, Jun. 2010, vol. 46 (6): 1447-1453.

\* cited by examiner

DOUBLE-ROTOR FLUX-SWITCHING MACHINE

CROSS-REFERENCE TO RELATED APPLICATION

The present application claims the benefit of U.S. Provisional Application Ser. No. 61/684,853, filed Aug. 20, 2012, which is hereby incorporated by reference herein in its entirety, including any figures, tables, and drawings.

BACKGROUND

Electrical motors are used in a wide variety of applications, such as naval vessels, aircrafts, washing machines, pumps, compressors, and hybrid vehicles. Advanced induction motors, permanent magnet motors, and high temperature superconducting motors are some examples that have been identified to be suitable for propulsion applications. Research has recently focused on permanent magnet motors as a basis for electrical propulsion.

Flux-switching machines belong to the class of doubly-salient permanent magnet (DPSM) machines but have not been traditionally used in the industry. Instead, surface-mounted permanent magnet or interior permanent magnet machines have been used. Existing flux-switching machines show some disadvantages, including relatively low torque density compared to other permanent magnet machines.

BRIEF SUMMARY

The subject invention provides novel and advantageous machines, as well as methods of manufacturing and using such machines. In many embodiments, a machine can have a flux-switching topology and can be a flux-switching machine (FSM). Such machines can be used as, e.g., motors and/or generators.

In one embodiment, an FSPMM includes a first rotor, a second rotor, and a stator disposed between the first rotor and the second rotor. The stator includes at least two permanent magnets and a coil wrapped around each permanent magnet, and the stator has a ring shape with an annular opening. All permanent magnets of the FSPMM are magnetized in the same circumferential direction.

In a further embodiment, the stator, all permanent magnets, and all coils are encapsulated in a non-magnetic encapsulating material.

In another embodiment, a method of manufacturing a flux-switching permanent magnet machine (FSPMM) includes: providing at least two permanent magnets; providing a coil wound around each permanent magnet; providing the permanent magnets having coils wound around them within a stator; and providing the stator between a first rotor and a second rotor. The stator has a ring shape with an annular opening, and all permanent magnets of the FSPMM are magnetized in the same circumferential direction.

In a further embodiment, the method includes encapsulating the stator, the permanent magnets, and the coils in a non-magnetic encapsulating material, prior to providing the stator between the first rotor and the second rotor. The method can also include magnetizing the permanent magnets such that all permanent magnets of the FSPMM are magnetized in the same circumferential direction, wherein magnetizing the permanent magnets is performed after encapsulating the stator, the permanent magnets, and the coils in the non-magnetic encapsulating material.

In yet another embodiment, an FSM includes a first rotor, a second rotor, and a stator disposed between the first rotor and the second rotor, wherein the stator has a ring shape with an annular opening, and wherein the stator includes the features of a, the features of b, or the features of c: a) at least two direct current (DC) field coils and a phase winding coil wrapped around each DC field coil; b) at least two high-temperature superconducting direct current (HTSCDC) field coils and a phase winding coil wrapped around each HTSCDC field coil; and c) at least two DC field coil/permanent magnet hybrid combinations and a phase winding coil wrapped around each DC field coil/permanent magnet hybrid combination, wherein each DC field coil/permanent magnet hybrid combination comprises a DC field coil, wherein all permanent magnets of the FSPMM are magnetized in the same circumferential direction.

BRIEF DESCRIPTION OF THE DRAWINGS

The patent or application file contains at least one drawing executed in color. Copies of this patent or patent application publication with color drawings will be provided by the Patent Office upon request and payment of the necessary fee.

DETAILED DISCLOSURE

Figure 1:
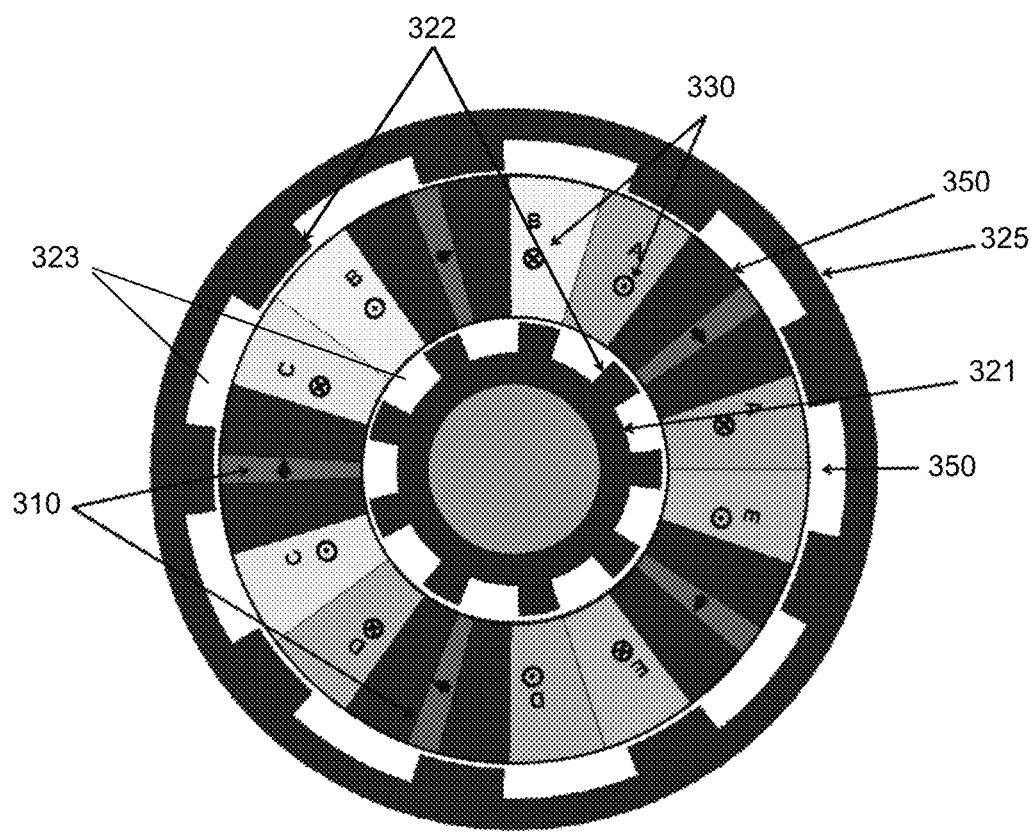
FIG. 1 is a cross-sectional diagram of a machine according to an embodiment of the subject invention.

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present.

In addition, references to "first", "second", and the like (e.g., first and second portion), as used herein, and unless otherwise specifically stated, are intended to identify a particular feature of which there may be more than one. Such reference to "first" does not imply that there must be two or more. These references are not intended to confer any order in time, structural orientation, or sidedness (e.g., left or right) with respect to a particular feature, unless explicitly stated.

The terms "Conventional" and "Proposed" are used in some of the figures. These refer to embodiments of the subject invention ("Proposed") compared with related art devices ("Conventional").

The subject invention provides novel and advantageous machines, as well as methods of manufacturing and using such machines. In many embodiments, a machine of the subject invention is a double-rotor (DR) motor, such as a motor having a doubly-salient permanent magnet (PM) motor. In many embodiments, a motor can have a flux-switching topology and can be a DR flux-switching machine or motor (FSM).

FSMs belong to the class of doubly-salient machines (DSM) and can have the highest torque density of all DSM machines. Even though they have high torque density compared to other DSMs, FSMs were not traditionally preferred as the performance was below that of other common PM machines such as a surface-mounted PM (SMPM) or interior PM (IPM) machine. A distinct advantage of the FSMs of the subject invention, compared to SMPM and IPM machines, is that the PMs are not rotating. The rotating part can be made of, e.g., silicon steel (and can use no other materials in certain embodiments) and is thus mechanically and thermally very rugged. Flux-switching PM (FSPM) machines according to the subject invention overcome disadvantages of conventional FSPM machines and have a torque density that can almost match, or even surpass, SMPM and IPM machines. For example, an FSPM machine according to the subject invention can have a torque density that is more than 40% higher than that of a conventional flux-switching machine.

In one embodiment of the subject invention, a machine can have a double-rotor topology. A machine of the subject invention can have a stator with coils (also referred to herein as "windings" and "phase windings") and/or one or more PMs. Such a machine can be configured such that the stator has an annular cross-section, with an outer rotor surrounding it and an inner rotor within it. The outer rotor can have a generally annular cross-section, and the inner rotor can have a generally circular cross-section. Such a motor has several advantages over existing motors, such as an SMPM. FSPMMs according to the subject invention can be considered doubly-salient rotary machines.

In embodiments of the subject invention, a machine can include two or more PMs, and all PMs can be magnetized in the same direction (for example, the same circumferential direction). Such a configuration is unique, as existing FSPM machines use oppositely-oriented magnets, and this unique configuration of the subject invention provides improved performance.

In many embodiments, a machine (e.g., an FSPM machine) of the subject invention can have at least one magnet (e.g., at least one PM). The number of magnets present in a machine of the subject invention can be, for example, any of the following values, at least any of the following values, at most any of the following values, or within any range having any of the following values as endpoints, though embodiments are not limited thereto: 1, 2, 3, 4, 5, 6, 7, 8, 9, 10, 11, 12, 13, 14, 15, 16, 17, 18, 19, 20, 25, 30, 35, 40, 45, 50, or 100. For example, the number of magnets present in a machine of the subject invention can be 5, 6, or 13.

FIG. 1 is a cross-sectional diagram showing the topology of an FSPM machine (FSPMM) according to one embodiment of the subject invention. Referring to FIG. 1, an FSPMM can include one or more magnets 310, one or more coils 330, an inner rotor 321, a stator 350, and an outer rotor 325. In many embodiments, the magnets 310 are PMs, and an FSPMM includes at least two PMs 310. The FSPMM can be configured such that all PMs 310 are magnetized in the same circumferential direction, as represented in FIG. 1 by the arrow on each magnet pointing in the same circumferential direction. The stator 350 can have an annular cross-section, with the outer rotor 325 surrounding it and the inner rotor 321 disposed within it. That is, the stator 350 can have the shape of an annular cylinder or a ring (i.e., similar to the shape of a pipe, with the stator forming the wall of the pipe). The outer rotor 325 can have a generally annular cross-section, with teeth 322 on an inner surface thereof facing the stator 350, and the inner rotor 321 can have a generally annular cross-section, with teeth 322 on an outer surface thereof facing the stator 350. The three-dimensional shape of the both the inner 321 and outer rotors 325 can be generally similar to that of the stator 350 (i.e., a ring or a generally annular cylinder. Another structure, such as a shaft, can be disposed within the inner rotor 321. In an alternative embodiment, the inner rotor 321 can have a generally cylindrical shape, with no other structure disposed within it.

In many embodiments, the cross-section of both the outer surface of the outer rotor 325 and the inner surface of the outer rotor 325 (not including the teeth 322) is circular, and the cross-section of the outer surface of the inner rotor 321 (not including the teeth 322), as well as an inner surface of the inner rotor 321 (if present), is circular.

The machine shown in FIG. 1 is a 5-phase, 9-pole motor, though embodiments are not limited thereto; the machine shown in FIG. 1 is for exemplary purposes only. Though FIG. 1 shows five PMs for exemplary purposes, embodiments are not limited thereto. Also, though FIG. 1 shows an inner rotor 321 and an outer rotor 325 for exemplary purposes, embodiments are not limited thereto. For example, a motor can have just one rotor 321, 325. Further, though FIG. 1 shows five phases (labeled A, B, C, D, and E) for exemplary purposes, embodiments are not limited thereto.

The number of phases present in a machine of the subject invention can be, for example, any of the following values, at least any of the following values, at most any of the following values, or within any range having any of the following values as endpoints, though embodiments are not limited thereto: 1, 2, 3, 4, 5, 6, 7, 8, 9, 10, 11, 12, 13, 14, 15, 16, 17, 18, 19, 20, 25, 30, 35, 40, 45, 50, or 100. For example, the number of phases present in a machine of the subject invention can be 5, 6, or 13.

The number of slots present in a machine of the subject invention can be, for example, any of the following values, at least any of the following values, at most any of the following values, or within any range having any of the following values as endpoints, though embodiments are not limited thereto: 1, 2, 3, 4, 5, 6, 7, 8, 9, 10, 11, 12, 13, 14, 15, 16, 17, 18, 19, 20, 25, 30, 35, 40, 45, 50, or 100. For example, the number of slots present in a machine of the subject invention can be 5, 6, or 13.

The number of poles present in a machine of the subject invention can be, for example, any of the following values, at least any of the following values, at most any of the following values, or within any range having any of the following values as endpoints, though embodiments are not limited thereto: 1, 2, 3, 4, 5, 6, 7, 8, 9, 10, 11, 12, 13, 14, 15, 16, 17, 18, 19, 20, 25, 30, 35, 40, 45, 50, or 100. For example, the number of poles present in a machine of the subject invention can be 9, 10, or 17.

Figure 18:
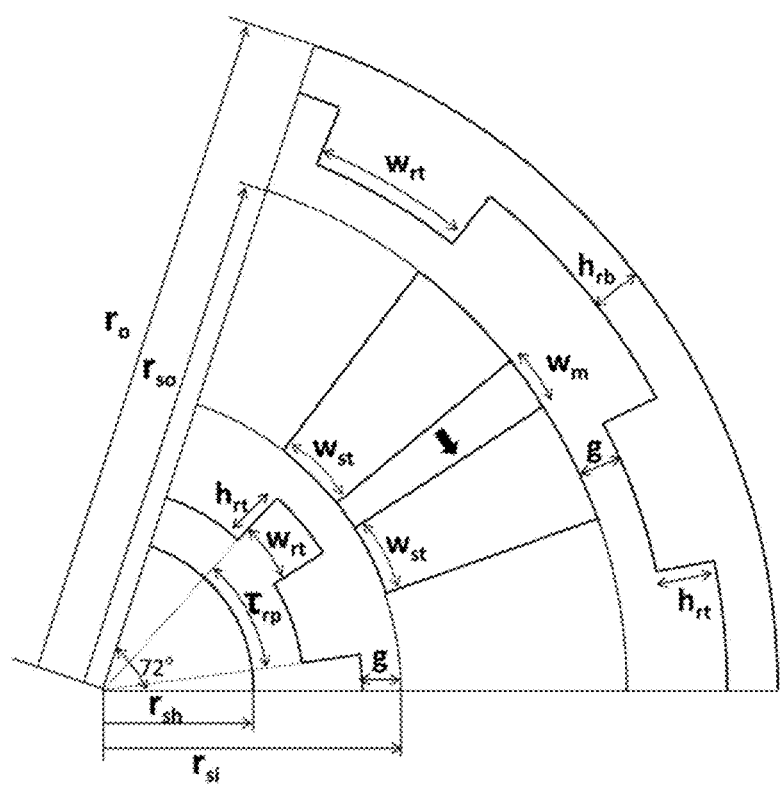
FIG. 18 is a cross-sectional diagram of a portion of a machine according to an embodiment of the subject invention.

In an FSM of the subject invention, the following quantities can be defined: $r_o$ is the outer radius; $r_{so}$ the stator outer radius; $r_{si}$ is the stator inner radius; $r_{sh}$ is the shaft (if present) radius; L is the stack length; $\tau_{rp}$ is the rotor tooth pitch; $w_{rt}$ is the rotor tooth width; $h_{rt}$ is the rotor tooth height; $h_{rb}$ is the rotor back-iron (if present) height; g is the air gap; $w_{st}$ is the stator tooth width; and $w_m$ is the magnet width. FIG. 18 shows a cross-sectional schematic of portion of an FSM indicating how these quantities are measured. The 72° cut-out shown in FIG. 18 is for exemplary purposes; not all machines will have the same number of magnets, rotor teeth, rotor gaps, etc. within such a section. Also, though the air gaps between the inner rotor and the stator and between the outer rotor and the stator are shown as equal, embodiments are not limited thereto.

The outer radius ($r_o$ in FIG. 18) of a machine of the subject invention can be, for example, any of the following values, at least any of the following values, at most any of the following values, or within any range having any of the following values as endpoints, though embodiments are not limited thereto (all numerical values are in mm): 0.01, 0.1, 1, 10, 50, 59, 100, 200, 300, 400, 500, or 1000. For example, the outer radius of a machine of the subject invention can be from 10-500 mm.

The stator outer radius ($r_{so}$ in FIG. 18) of a machine of the subject invention can be, for example, any of the following values, at least any of the following values, at most any of the following values, or within any range having any of the following values as endpoints, though embodiments are not limited thereto (all numerical values are in mm): 0.01, 0.1, 1, 8, 10, 48, 50, 100, 200, 300, 400, 498, 500, or 1000. For example, the stator outer radius of a machine of the subject invention can be from 8-498 mm.

The stator inner radius ($r_{si}$ in FIG. 18) of a machine of the subject invention can be, for example, any of the following values, at least any of the following values, at most any of the following values, or within any range having any of the following values as endpoints, though embodiments are not limited thereto (all numerical values are in mm): 0.01, 0.1, 1, 6, 10, 25, 50, 100, 200, 300, 400, 496, 500, or 1000. For example, the stator inner radius of a machine of the subject invention can be from 6-496 mm.

The shaft radius ($r_{sh}$ in FIG. 18) of a machine of the subject invention can be, for example, any of the following values, at least any of the following values, at most any of the following values, or within any range having any of the following values as endpoints, though embodiments are not limited thereto (all numerical values are in mm): 0.01, 0.1, 1, 10, 14, 50, 100, 200, 300, 400, 494, 500, or 1000. For example, the shaft radius of a machine of the subject invention can be from 1-494 mm.

The stack length of a machine of the subject invention can be, for example, any of the following values, at least any of the following values, at most any of the following values, or within any range having any of the following values as endpoints, though embodiments are not limited thereto (all numerical values are in mm): 0.01, 0.1, 1, 5, 10, 50, 100, 200, 300, 400, 500, 1000, 2000, 3000, 4000, 5000, or 10000. For example, the stack length of a machine of the subject invention can be from 5-5000 mm.

The rotor tooth pitch ($\tau_{rp}$ in FIG. 18) of a machine of the subject invention can be, for example, any of the following values, at least any of the following values, at most any of the following values, or within any range having any of the following values as endpoints, though embodiments are not limited thereto (all numerical values are angles in degrees): 0.01, 0.1, 0.6, 1, 5, 10, 20, 30, 40, 50, 60, 70, 80, 90, 100, 110, 120, 130, 140, 150, 160, 170, or 180. For example, the rotor tooth pitch of a machine of the subject invention can be from 0.6 to 180 degrees.

The rotor tooth width ($w_{rt}$ in FIG. 18) of a machine of the subject invention can be, for example, any of the following values, at least any of the following values, at most any of the following values, or within any range having any of the following values as endpoints, though embodiments are not limited thereto (all numerical values are angles in degrees): 0.01, 0.1, 0.5, 1, 5, 10, 20, 30, 40, 50, 60, 70, 75, 80, 90, 100, 110, or 120. For example, the rotor tooth width of a machine of the subject invention can be from 0.5 to 75 degrees.

The rotor tooth height ($h_{rt}$ in FIG. 18) of a machine of the subject invention can be, for example, any of the following values, at least any of the following values, at most any of the following values, or within any range having any of the following values as endpoints, though embodiments are not limited thereto (all numerical values are in mm): 0.01, 0.1, 1, 10, 20, 30, 40, 50, 60, 70, 80, 90, 100, 150, 200, 300, 400, or 500. For example, the rotor tooth height of a machine of the subject invention can be from 1-100 mm.

The rotor back-iron height ($h_{rb}$ in FIG. 18) of a machine of the subject invention can be, for example, any of the following values, at least any of the following values, at most any of the following values, or within any range having any of the following values as endpoints, though embodiments are not limited thereto (all numerical values are in mm 0.01, 0.1, 1, 10, 20, 30, 40, 50, 60, 70, 80, 90, 100, 150, 200, 300, 400, or 500. For example, the rotor back-iron height of a machine of the subject invention can be from 1-100 mm.

Each air gap (g in FIG. 18) of a machine of the subject invention can be, for example, any of the following values, at least any of the following values, at most any of the following values, or within any range having any of the following values as endpoints, though embodiments are not limited thereto (all numerical values are in mm): 0.001, 0.01, 0.1, 1, 2, 3, 4, 5, 6, 7, 8, 9, 10, 20, 30, 40, 50, 60, 70, 80, 90, or 100. For example, each air gap of a machine of the subject invention can be from 0.1-50 mm.

The stator tooth width ($w_{st}$ in FIG. 18) of a machine of the subject invention can be, for example, any of the following values, at least any of the following values, at most any of the following values, or within any range having any of the following values as endpoints, though embodiments are not limited thereto (all numerical values are angles in degrees): 0, 0.001, 0.01, 0.1, 0.5, 1, 5, 10, 20, 30, 40, 50, 60, 70, 80, 85, 88, 90, 100, 110, 120, 130, 140, or 150. For example, the stator tooth width of a machine of the subject invention can be from 0 to 88 degrees.

The magnet width ($w_m$ in FIG. 18) of a machine of the subject invention can be, for example, any of the following values, at least any of the following values, at most any of the following values, or within any range having any of the following values as endpoints, though embodiments are not limited thereto (all numerical values are angles in degrees): 0, 0.001, 0.01, 0.1, 0.5, 1, 5, 10, 20, 30, 40, 50, 60, 70, 80, 90, 100, 110, 120, 130, 140, 150, 160, 170, 175, or 180. For example, the magnet width of a machine of the subject invention can be from 0.5 to 175 degrees.

Figure 2:
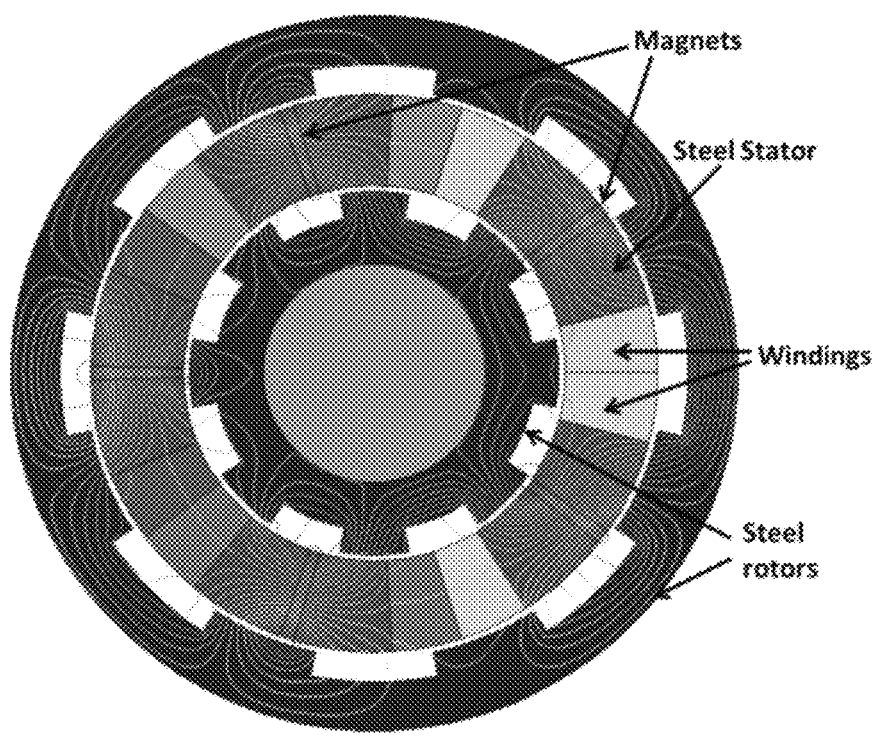
FIG. 2 is a cross-sectional diagram showing open-circuit flux lines of a machine according to an embodiment of the subject invention.

In many embodiments, an FSPMM can have an inner rotor 321 and an outer rotor 325, and the two rotors can be displaced from each other. The displacement can be by, e.g., half a pole-pitch, though embodiments are not limited thereto. That is, the rotors can be configured such that the teeth 322 from the outer rotor 325 line up with the gaps 323 (formed between the teeth 322) of the inner rotor 321, and vice versa. Such a configuration is shown in FIG. 2. A displacement as described can help maintain symmetry for flux flow. In an alternative embodiment, the two rotors can be lined up such that the teeth 322 from the outer rotor 325 line up with the teeth 322 of the inner rotor 321, and the gaps 323 of the outer rotor 325 line up with the gaps 323 of the inner rotor 321.

In many embodiments, one or more of the magnets 310 can have a coil 330 wrapped around it. For example, each magnet 310 present can have a coil 330 wrapped around it. The windings of the coil 330 can be concentrated. It is to be understood that the coil 330 does not have to be wrapped directly around the magnet 310, and in many cases will be wrapped around a portion of the stator 350 such that the coil 330 wraps around the magnet 310 with the portion of the stator 350 disposed therebetween.

In many embodiments, an FSPMM can be yokeless. The term yokeless means that no yoke is present in the FSPMM; that is, the FSPMM is configured to not have a yoke. For example, the FSPMM can be without a back-iron in the stator. In certain embodiments, the stator components are held together with a non-magnetic material (an "encapsulator"). The encapsulator can be any suitable material known in the art, for example, aluminum or an epoxy. In a particular embodiment, the encapsulator is aluminum with a thermally conductive epoxy resin.

The double-rotor FSPMM of the subject invention is similar in certain respects to the flux-switching linear machine described in U.S. patent application Ser. No. 13/734,404 (hereinafter referred to as "the '404 application"), filed Jan. 4, 2013, which is hereby incorporated by reference in its entirety, including any figures, tables, and drawings. The double-rotor FSPMM is similar to a double-stator version of the machine described in the '404 application, with each stator folded around on itself to correspond to the inner and outer rotors of the subject invention, and the mover folded around on itself to correspond to the stator of the subject invention. A key difference is that FSPMMs of the subject invention provide rotary motion while motors of the '404 application provide linear actuation.

FIG. 2 shows open-circuit flux lines for the machine shown in FIG. 1. The machine of the subject invention can utilize the width of winding slots to focus the flux through stator teeth.

Figure 3:
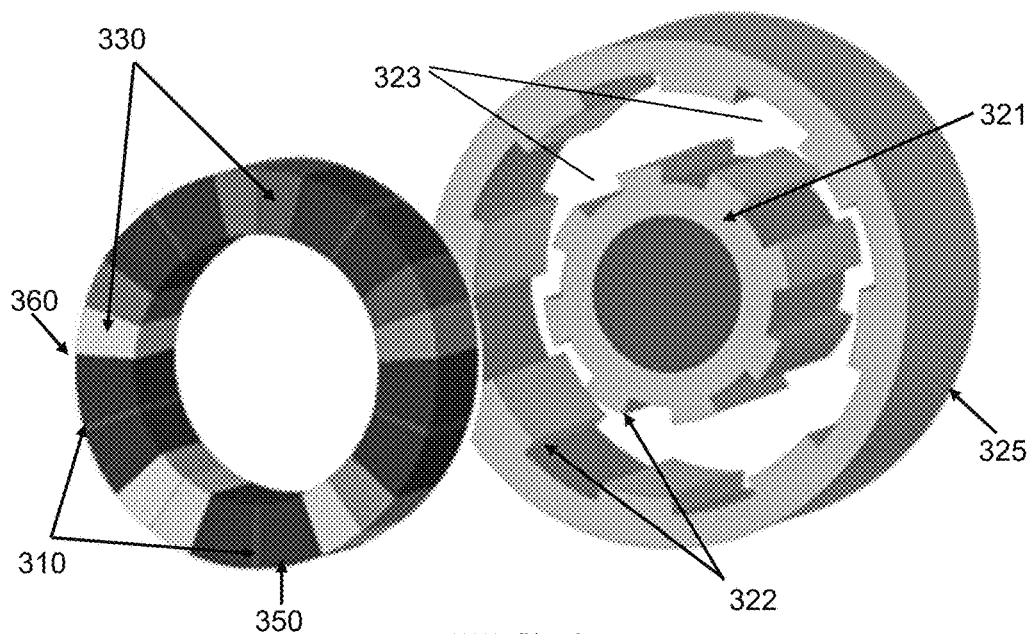
FIG. 3 is an exploded perspective view of a machine according to an embodiment of the subject invention. End-connections of the stator windings are not shown for clarity purposes.

FIG. 3 shows an exploded perspective view of an FSPMM according to an embodiment of the subject invention. Referring to FIG. 3, the stator 350 is pulled out of the rotors for illustrative purposes. The stator 350 can have a very modular structure that can simplify the construction process. Each module can be made of a material with high magnetic permeability (e.g., soft magnetic composites (SMC) or steel, such as laminated silicon steel) with an embedded magnet 310 (e.g., a PM), and the coil 330 can be wound around the material with the embedded magnet. Each phase of the machine can have one or more coils, and the coils can be in series, though embodiments are not limited thereto. The number of coils multiplied by the number of phases determines the number of modules in the stator. Even with concentrated windings, the open-circuit back-emfs can be sinusoidal. The entire stator 350 can be enclosed in a non-magnetic material, such as epoxy resin or aluminum. The rotors 320, including the inner 321 and outer 325 rotors, can be made of a material with high magnetic permeability (e.g., SMC or steel, such as laminated steel). The rotors 320 can be placed such that they are half a pole-pitch apart to ensure symmetry, though embodiments are not limited thereto. That is, the teeth 322 of the inner rotor 321 can be aligned with the gaps 323 of the outer rotor 325, and vice versa. A yokeless motor is shown in FIG. 3, and all of the stator components (e.g., magnets 310, coils 330, and stator material) can be encapsulated by a non-magnetic encapsulating material 360 (e.g., epoxy). The rotors 320 are not encapsulated by the encapsulating material 360. In a particular embodiment, the encapsulator material can be a thermally conductive epoxy resin (e.g., 50-3185 NC, available from Epoxies, etc.). Such resins have tensile strengths of more than 8,000 psi and a shore-D hardness of more than 94, which is sufficient for encapsulating a translator of an FSPMM of the subject invention.

Figure 4:
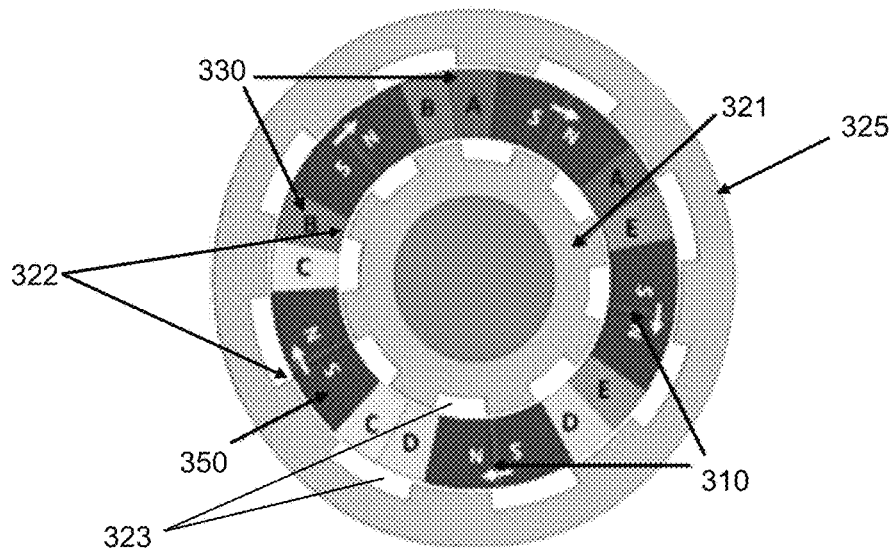
FIG. 4 is cross-sectional diagram of a machine according to an embodiment of the subject invention.
Figure 5:
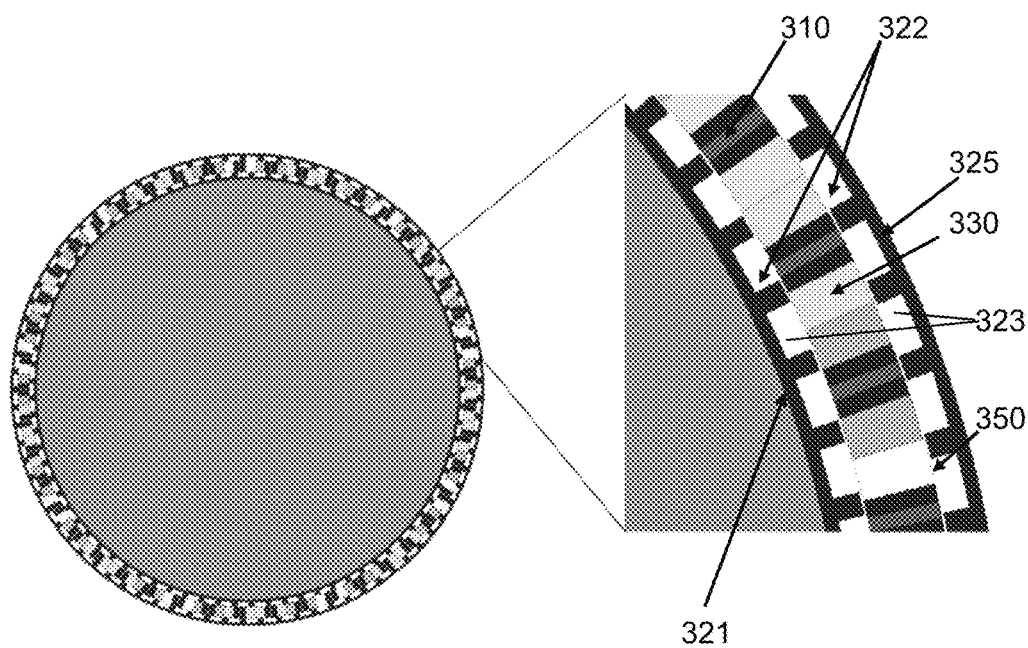
FIG. 5 is cross-sectional diagram of a machine according to an embodiment of the subject invention.
Figure 6:
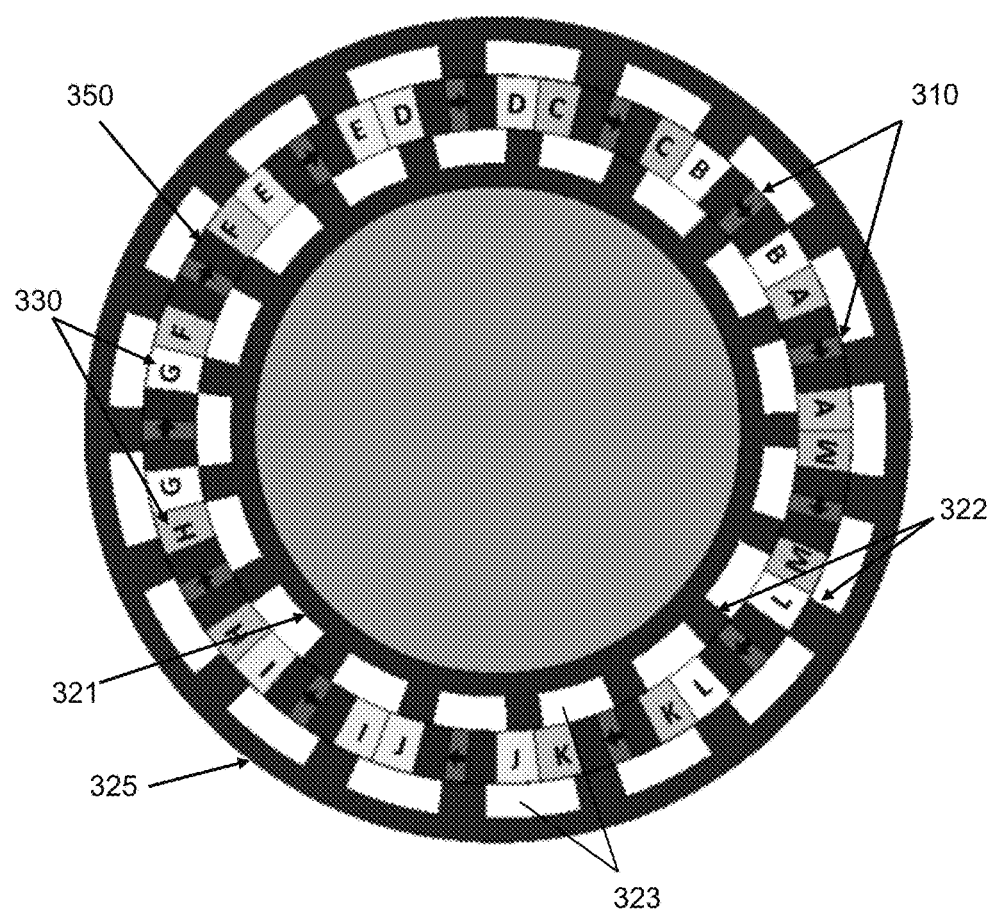
FIG. 6 is cross-sectional diagram of a machine according to an embodiment of the subject invention.

FIG. 4 is a cross-sectional diagram showing an FSPMM according to one embodiment of the subject invention. All magnets 310 are magnetized in the same circumferential direction. The motor shown in FIG. 4 is a 5-phase, 8-pole motor, shown for exemplary purposes. Though FIG. 4 shows five phases (labeled A, B, C, D, and E) and five magnets for exemplary purposes, embodiments are not limited thereto. FIG. 5 shows an FSPMM according to an embodiment of the subject invention having a very high number of magnets and poles. The rotors are configured such that they are half a pole-pitch apart; i.e., the teeth 322 of the inner rotor 321 are aligned with the gaps 323 of the outer rotor 325, and vice versa. All magnets 310 are magnetized in the same circumferential direction. FIG. 6 shows an FSPMM according to an embodiment of the subject invention having 13 magnets, 13 phases, and 17 poles. All magnets 310 are magnetized in the same circumferential direction. The rotors are configured such that they are half a pole-pitch apart; i.e., the teeth 322 of the inner rotor 321 are aligned with the gaps 323 of the outer rotor 325, and vice versa.

Each magnet present in the machines of the subject invention can be made of any suitable material known in the art. For example, magnets can be made of neodymium ferrite boron (NdFeB) or aluminum nickel cobalt (AlNiCo), though embodiments are not limited thereto. In a specific embodiment, magnets can be made of NdFeB-30.

Each rotor present in the machines of the subject invention can be made of any suitable material known in the art. For example, each rotor can be made of SMC or steel, such as carbon steel or laminated carbon steel (e.g., laminated carbon steel 1010), though embodiments are not limited thereto.

Each coil present in the machines of the subject invention can be made of any suitable material known in the art. For example, coils can be made of copper, though embodiments are not limited thereto.

In certain embodiments, a machine can include one or more shafts. Each shaft present in the motors of the subject invention can be made of any suitable material known in the art. For example, shafts can be made of cold-rolled or hot-rolled steel (e.g., stainless steel), though embodiments are not limited thereto.

Figure 14:
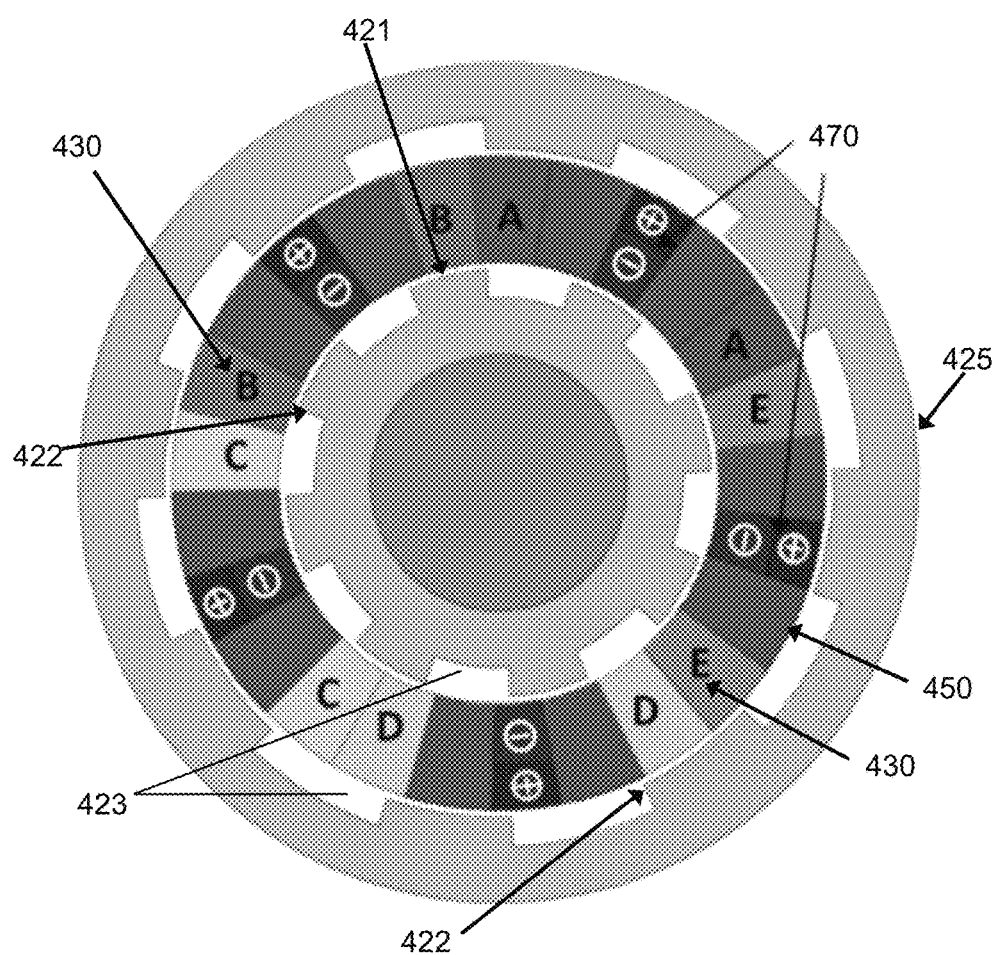
FIG. 14 is cross-sectional diagram of a machine according to an embodiment of the subject invention.

In one embodiment, an FSM can include direct current (DC) field coils in place of magnets. FIG. 14 is a cross-sectional diagram showing an FSPMM having DC field coils instead of magnets. Referring to FIG. 14, an FSM can include one or more DC field coils 470, one or more phase windings 430, an inner rotor 421, a stator 450, and an outer rotor 425. The FSM can include at least two DC field coils 470. The FSM can be configured such that the positive-negative axis orientation of all DC field coils 470 is in the same radial direction, though embodiments are not limited thereto. For example, the DC field coils 470 can be arranged such that the negative and positive sides are lined up perpendicular to the circumferential direction of motion and all coils 470 have the positive side closer to the outer rotor 425 than it is to the inner rotor 421, as shown in FIG. 14, though embodiments are not limited thereto (e.g., the DC field coils 470 can be arranged such that all have the negative side closer to the outer rotor 425 than it is to the inner rotor 421). In an alternative embodiment, the positive-negative axis orientation of the DC field coils 470 are not necessarily in the same radial direction.

The stator 450 can have an annular cross-section, with the outer rotor 425 surrounding it and the inner rotor 421 disposed within it. That is, the stator 450 can have the shape of an annular cylinder or a ring.

The outer rotor 425 can have a generally annular cross-section, with teeth 422 on an inner surface thereof facing the stator 450, and the inner rotor 421 can have a generally annular cross-section, with teeth 422 on an outer surface thereof facing the stator 450. The three-dimensional shape of the both the inner 421 and outer rotors 425 can be generally similar to that of the stator 450 (i.e., a ring or a generally annular cylinder. Another structure, such as a shaft, can be disposed within the inner rotor 421. In an alternative embodiment, the inner rotor 421 can have a generally cylindrical shape, with no other structure disposed within it. The cross-section of both the outer surface of the outer rotor 425 and the inner surface of the outer rotor 425 (not including the teeth 422) is circular, and the cross-section of the outer surface of the inner rotor 421 (not including the teeth 422), as well as an inner surface of the inner rotor 421 (if present), is circular.

The inner rotor 421 and the outer rotor 425 can be displaced from each other. The displacement can be by, e.g., half a pole-pitch. That is, the rotors can be configured such that the teeth 422 from the outer rotor 425 line up with the gaps 423 (formed between the teeth 422) of the inner rotor 421, and vice versa. Such a configuration is shown in FIG. 14. In an alternative embodiment, the two rotors can be lined up such that the teeth 422 from the outer rotor 425 line up with the teeth 422 of the inner rotor 421, and the gaps 423 of the outer rotor 425 line up with the gaps 423 of the inner rotor 421. Also, in a particular embodiment, each DC field coil 470 can have a phase winding 430 wrapped around it. The phase windings 430 can be concentrated. The phase winding 430 does not have to be wrapped directly around the DC field coil 470, and in many cases will be wrapped around a portion of the stator 450 such that the phase winding 430 wraps around the DC field coil 470 with the portion of the stator 450 disposed therebetween.

Figure 15:
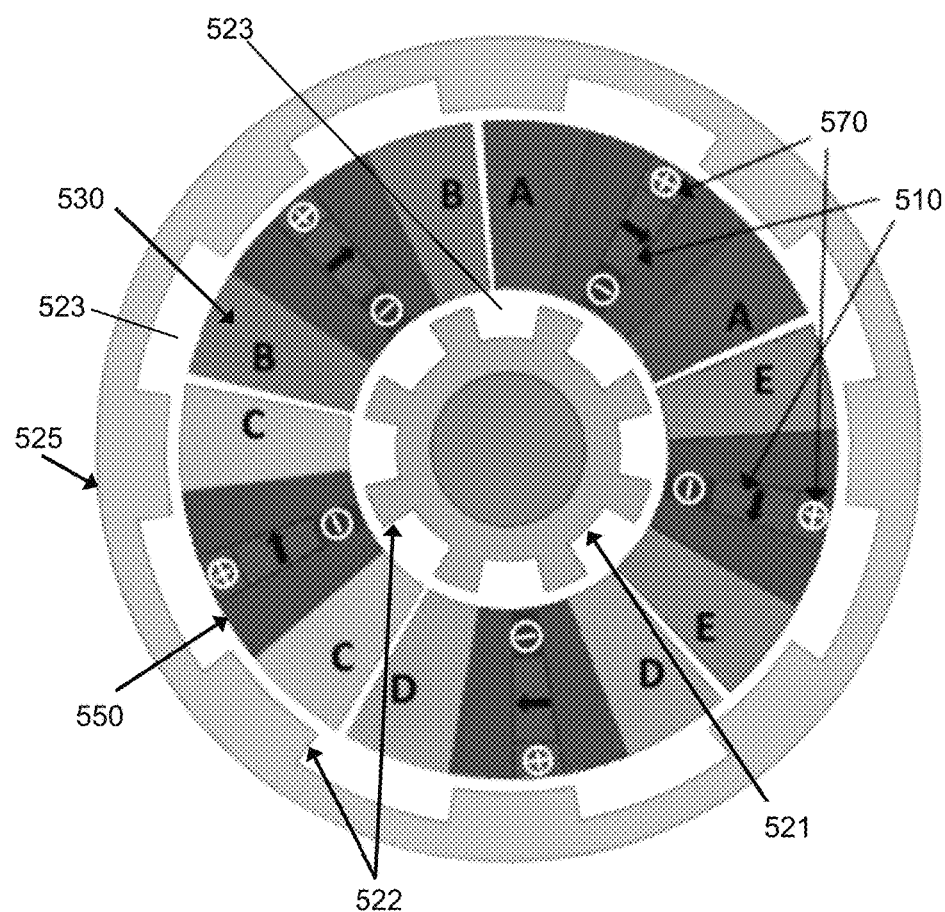
FIG. 15 is cross-sectional diagram of a machine according to an embodiment of the subject invention.

In another embodiment, an FSM can include direct current (DC) field coils and magnets. The magnets can be disposed, for example, adjacent to the DC field coils or between the negative and positive sides of the DC field coils, though embodiments are not limited thereto. FIG. 15 is a cross-sectional diagram showing an FSM having DC field coils and magnets. Referring to FIG. 15, an FSM can include one or more DC field coils 570, one or more magnets 510, one or more phase windings 530, an inner rotor 521, a stator 550, and an outer rotor 525. The magnets 510 can be PMs, and the FSM can include at least two PMs 510. The FSM can be configured such that all PMs 510 are magnetized in the same circumferential direction, as represented in FIG. 15 by the arrow on each magnet pointing in the same circumferential direction. The FSM can include at least two DC field coils 570. The FSM can be configured such that all DC field coils 570 are arranged the same way, though embodiments are not limited thereto. For example, the DC field coils 570 can be arranged such that the negative and positive sides are lined up perpendicular to the circumferential direction of motion and all coils 570 have the positive side closer to the outer rotor 525 than it is to the inner rotor 521, as shown in FIG. 15, though embodiments are not limited thereto (e.g., the DC field coils 570 can be arranged such that all have the negative side closer to the outer rotor 525 than it is to the inner rotor 521, or the DC field coils 570 can be arranged such that some have the negative side closer to the outer rotor 525 and others have the negative side closer to the inner rotor 521). In an alternative embodiment, the positive-negative axis orientation of the DC field coils 570 are not necessarily in the same radial direction.

The stator 550 can have an annular cross-section, with the outer rotor 525 surrounding it and the inner rotor 521 disposed within it. That is, the stator 550 can have the shape of an annular cylinder or a ring.

The outer rotor 525 can have a generally annular cross-section, with teeth 522 on an inner surface thereof facing the stator 550, and the inner rotor 521 can have a generally annular cross-section, with teeth 522 on an outer surface thereof facing the stator 550. The three-dimensional shape of the both the inner 521 and outer rotors 525 can be generally similar to that of the stator 550 (i.e., a ring or a generally annular cylinder. Another structure, such as a shaft, can be disposed within the inner rotor 521. In an alternative embodiment, the inner rotor 521 can have a generally cylindrical shape, with no other structure disposed within it. The cross-section of both the outer surface of the outer rotor 525 and the inner surface of the outer rotor 525 (not including the teeth 522) is circular, and the cross-section of the outer surface of the inner rotor 521 (not including the teeth 522), as well as an inner surface of the inner rotor 521 (if present), is circular.

The inner rotor 521 and the outer rotor 525 can be displaced from each other. The displacement can be by, e.g., half a pole-pitch. That is, the rotors can be configured such that the teeth 522 from the outer rotor 525 line up with the gaps 523 (formed between the teeth 522) of the inner rotor 521, and vice versa. Such a configuration is shown in FIG. 14. In an alternative embodiment, the two rotors can be lined up such that the teeth 522 from the outer rotor 525 line up with the teeth 522 of the inner rotor 521, and the gaps 523 of the outer rotor 525 line up with the gaps 523 of the inner rotor 521. Also, in a particular embodiment, each DC field coil 570/magnet 510 combination can have a phase winding 530 wrapped around it. The phase windings 530 can be concentrated. The phase winding 530 does not have to be wrapped directly around the DC field coil 570/magnet 510 combination, and in many cases will be wrapped around a portion of the stator 550 such that the phase winding 530 wraps around the DC field coil 570/magnet 510 combination with the portion of the stator 550 disposed therebetween.

Figure 16:
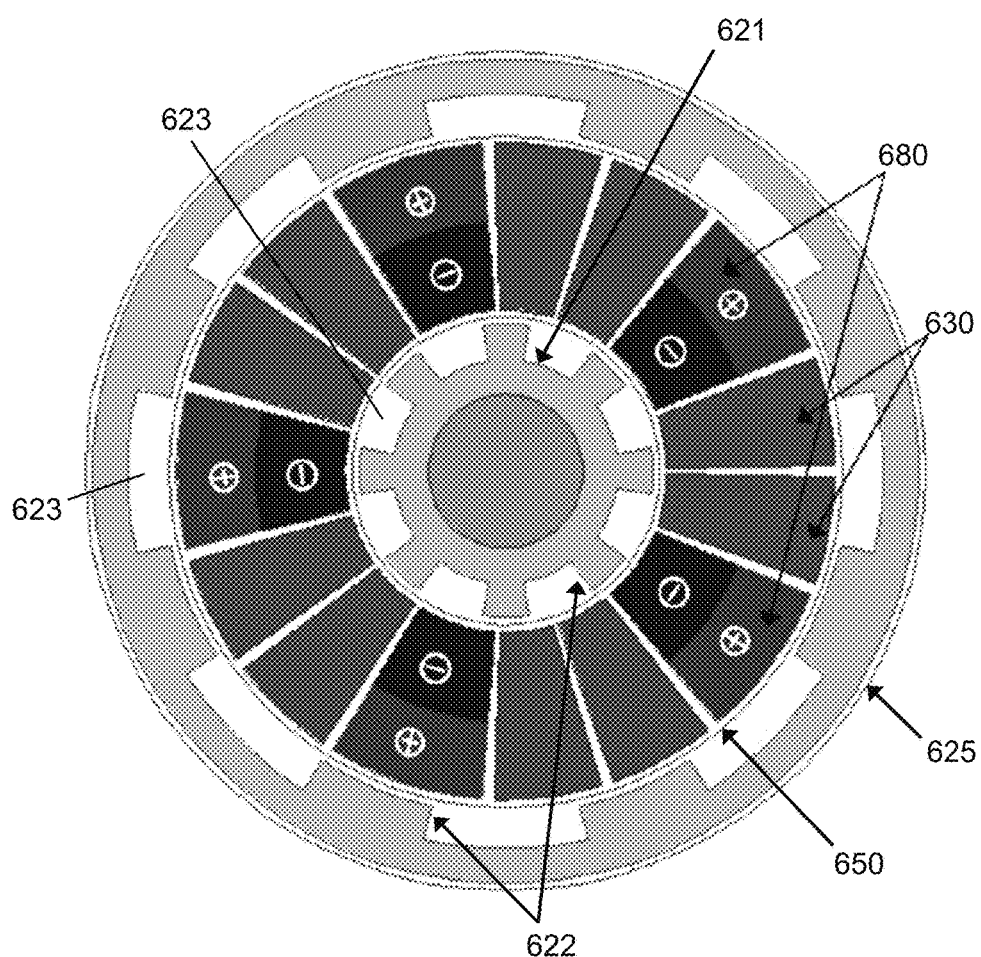
FIG. 16 is cross-sectional diagram of a machine according to an embodiment of the subject invention.

In yet another embodiment, an FSM can include high-temperature superconducting direct current (HTSCDC) field coils in place of magnets. FIG. 16 is a cross-sectional diagram showing an FSM having HTSCDC field coils instead of magnets. Referring to FIG. 16, an FSM can include one or more HTSCDC field coils 680, one or more phase windings 630, an inner rotor 621, a stator 650, and an outer rotor 625. The FSM can include at least two HTSCDC field coils 680. The FSM can be configured such that all HTSCDC field coils 680 are arranged the same way, though embodiments are not limited thereto. For example, the HTSCDC field coils 680 can be arranged such that the negative and positive sides are lined up perpendicular to the circumferential direction of motion and all coils 680 have the positive side closer to the outer rotor 625 than it is to the inner rotor 621, as shown in FIG. 16, though embodiments are not limited thereto (e.g., the HTSCDC field coils 680 can be arranged such that all have the negative side closer to the outer rotor 625 than it is to the inner rotor 621). In an alternative embodiment, the positive-negative axis orientation of the HTSCDC field coils 670 are not necessarily in the same radial direction.

The stator 650 can have an annular cross-section, with the outer rotor 625 surrounding it and the inner rotor 621 disposed within it. That is, the stator 650 can have the shape of an annular cylinder or a ring.

The outer rotor 625 can have a generally annular cross-section, with teeth 622 on an inner surface thereof facing the stator 650, and the inner rotor 621 can have a generally annular cross-section, with teeth 622 on an outer surface thereof facing the stator 650. The three-dimensional shape of the both the inner 621 and outer rotors 625 can be generally similar to that of the stator 650 (i.e., a ring or a generally annular cylinder. Another structure, such as a shaft, can be disposed within the inner rotor 621. In an alternative embodiment, the inner rotor 621 can have a generally cylindrical shape, with no other structure disposed within it. The cross-section of both the outer surface of the outer rotor 625 and the inner surface of the outer rotor 625 (not including the teeth 622) is circular, and the cross-section of the outer surface of the inner rotor 621 (not including the teeth 622), as well as an inner surface of the inner rotor 621 (if present), is circular.

The inner rotor 621 and the outer rotor 625 can be displaced from each other. The displacement can be by, e.g., half a pole-pitch. That is, the rotors can be configured such that the teeth 622 from the outer rotor 625 line up with the gaps 623 (formed between the teeth 622) of the inner rotor 621, and vice versa. Such a configuration is shown in FIG. 16. In an alternative embodiment, the two rotors can be lined up such that the teeth 622 from the outer rotor 625 line up with the teeth 622 of the inner rotor 621, and the gaps 623 of the outer rotor 625 line up with the gaps 623 of the inner rotor 621. Also, in a particular embodiment, each HTSCDC field coil 680 can have a phase winding 630 wrapped around it. The phase windings 630 can be concentrated. The phase winding 630 does not have to be wrapped directly around the HTSCDC field coil 670, and in many cases will be wrapped around a portion of the stator 650 such that the phase winding 630 wraps around the HTSCDC DC field coil 670 with the portion of the stator 650 disposed therebetween.

In yet another embodiment, an FSM can include field coils and magnets, as shown in FIG. 15 and as discussed above with reference to FIG. 15, but the field coils can be HTSCDC field coils.

Figure 17:
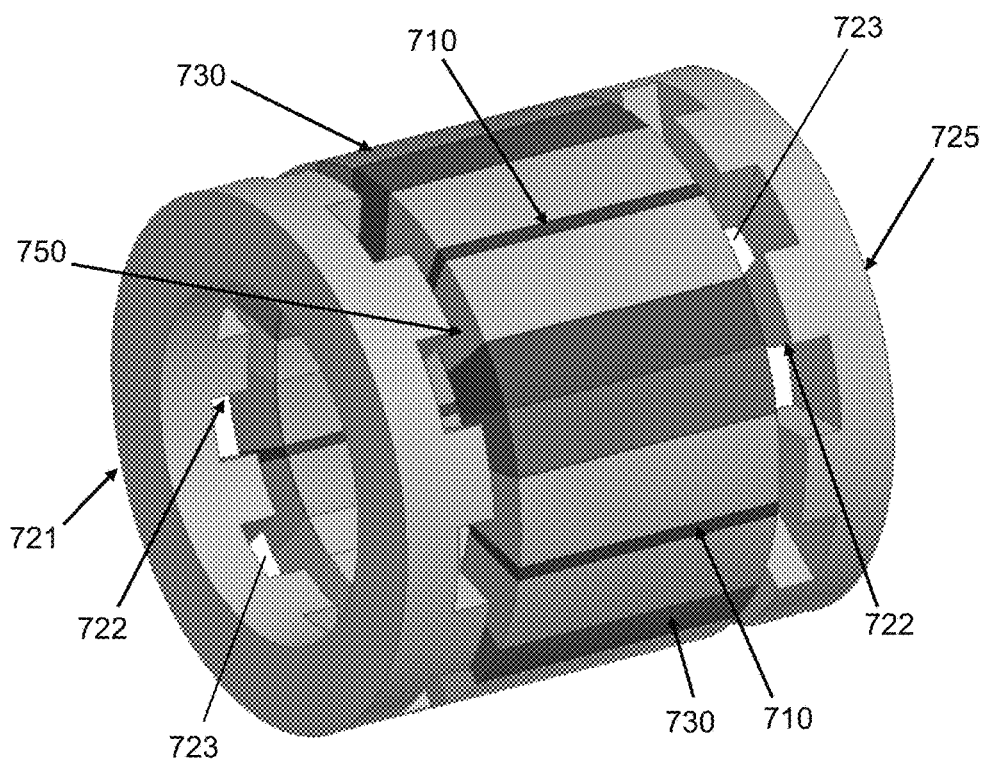
FIG. 17 is perspective view of a machine according to an embodiment of the subject invention. End-connections of the stator windings are not shown for clarity purposes.

In yet another embodiment, an FSM can have an axial arrangement of the rotors and the stator instead of a rotary arrangement. FIG. 17 is a cross-sectional diagram showing an axial FSM. Referring to FIG. 17, an axial FSM can include one or more magnets 710, one or more coils 730, a first rotor 721, a stator 750, and a second rotor 725. The magnets 710 can be PMs, and the FSM can include at least two PMs 710. The FSM can be configured such that all PMs 710 are magnetized in the same circumferential direction. The stator 750 can have an annular cross-section, such that the stator 750 can have the shape of an annular cylinder or a ring. The first 721 rotor can have a generally annular cross-section, with teeth 722 on an upper surface thereof facing the stator 750, and the second rotor 725 can have a generally annular cross-section, with teeth 722 on a lower surface thereof facing the stator 750. The three-dimensional shape of both the first 721 and second 725 rotors can be generally similar to that of the stator 750 (i.e., a ring or a generally annular cylinder). Though FIG. 17 depicts a hole in the center of the rotors 721, 725 and the stator 750, embodiments are not limited thereto. One or more of the first rotor 721, the second rotor 725, and the stator 750 can be solid all the way through (giving a cylindrical or disc shape) and/or one or more of these structures can have another structure (e.g., a shaft) filling in the hole.

The first rotor 721 and the second rotor 725 can be displaced from each other. The displacement can be by, e.g., half a pole-pitch. That is, the rotors can be configured such that the teeth 722 from the first rotor 721 line up with the gaps 723 (formed between the teeth 722) of the second rotor 725, and vice versa. Such a configuration is shown in FIG. 17. Also, in a particular embodiment, each magnet 710 can have a phase winding 730 wrapped around it. The phase windings 730 can be concentrated. The phase winding 730 does not have to be wrapped directly around the magnet 710, and in many cases will be wrapped around a portion of the stator 750 such that the phase winding 730 wraps around the magnet 710 with the portion of the stator 750 disposed therebetween.

In further embodiments, the axial structure shown in FIG. 17 can be modified by: replacing the magnets with DC field coils (similar to the embodiment shown in FIG. 14, but with the axial structure); using DC field coils in addition to magnets (similar to the embodiment shown in FIG. 15, but with the axial structure); replacing the magnets with HTSCDC field coils (similar to the embodiment shown in FIG. 14, but with the axial structure); using HTSCDC field coils in addition to magnets (similar to the embodiment shown in FIG. 15, but with the axial structure and with HTSCDC field coils instead of the DC coils 570).

In one embodiment, a method of manufacturing an FSM includes providing at least two permanent magnets, providing a coil wound around each permanent magnet, providing the permanent magnets having coils wound within a stator having an annular cross-section, and providing the stator between an outer rotor and an inner rotor. The order in which the rotors are provided does not matter; i.e., the inner rotor can be provided within the stator before the outer rotor is provided around the stator, or vice versa. The rotors can be provided such that they are displaced from each other. The displacement can be by half a pole pitch, i.e., such that the rotor teeth of the inner rotor are aligned with the teeth gaps between the rotor teeth of the outer rotor and vice versa, though embodiments are not limited thereto.

In a further embodiment, the method includes encapsulating the stator, the magnets, and the coils in a non-magnetic material (as discussed herein) before providing them between the rotors.

In yet a further embodiment, the method includes magnetizing the magnets such that all magnets are magnetized in the same circumferential direction. In a particular embodiment, the magnets can be magnetized after coils are wound around the magnets, after the magnets and coils are provided within the stator, or even after the stator is provided between the inner and outer rotors. That is, the magnets can be magnetized externally.

In further embodiments, the method can include forming the magnets, forming the coils, forming the stator, and/or forming the rotors.

In yet further embodiments, the steps involving the magnets can be replaced with DC field coils or HTSCDC field coils, or the steps involving the magnets can be supplemented with providing DC field coils or HTSCDC field coils and then performing each step performed on the magnets on the DC field coils or HTSCDC field coils as well.

In another embodiment, a method of manufacturing an axial FSM includes providing at least two permanent magnets, providing the permanent magnets within a stator having an annular cross-section, providing a coil wound around each permanent magnet (each coil can be wound around a portion of the stator with the stator within it), and providing the stator axially between a first rotor and a second rotor (e.g., in the manner shown in FIG. 17). The order in which the rotors are provided does not matter; i.e., the first rotor can be provided on one side of the stator before the outer rotor is provided on the other side of the stator, or vice versa. The rotors can be provided such that they are displaced from each other. The displacement can be by, e.g., half a pole pitch (i.e., such that the rotor teeth of the first rotor are aligned with the teeth gaps between the rotor teeth of the second rotor and vice versa).

In a further embodiment, the method of manufacturing an axial FSM includes encapsulating the stator, the magnets, and the coils in a non-magnetic material (as discussed herein) before providing them between the rotors.

In yet a further embodiment, the method of manufacturing an axial FSM includes magnetizing the magnets such that all magnets are magnetized in the same circumferential direction. In a particular embodiment, the magnets can be magnetized after coils are wound around the magnets, after the magnets and coils are provided within the stator, or even after the stator is provided between the rotors. That is, the magnets can be magnetized externally.

In further embodiments, the method of manufacturing an axial FSM can include forming the magnets, forming the coils, forming the stator, and/or forming the rotors.

In yet further embodiments, the steps (of the method of manufacturing an axial FSM) involving the magnets can be replaced with DC field coils or HTSCDC field coils, or the steps involving the magnets can be supplemented with providing DC field coils or HTSCDC field coils and then performing each step performed on the magnets on the DC field coils or HTSCDC field coils as well.

In one embodiment, a method of using an FSM as described herein includes providing an FSM as described herein and using it according to its normal functions. For example, an FSM can be used to provide rotary movement.

FSMs according to embodiments of the subject invention have several advantages over existing motors. Flux-switching topology combines the advantages of both switched reluctance machines and PM machines and thereby gives high torque density. The torque density is even higher than surface-mounted PM machines or interior PM machines with the same amount of magnet volume and active machine volume.

The use of a yokeless stator in embodiments of the subject invention allows very good torque versus current linearity, which is highly beneficial—for example, when overloading the machine due to emergency situations.

The highly modular structure of the FSM allows it to operate with several different numbers of phases (e.g., 3, 5, 13, etc.). With multiple phases, the machine can be operated well even under fault conditions. The construction of the machine is easy due to the modular structure.

Also, the cogging torque is very low (e.g., <1% of torque) for unique slot-pole combinations of the device. In addition, the motor can be modified easily to have either sinusoidal or trapezoidal back-emf depending on the application.

The saturation effect on the torque is very small in embodiments of the subject invention due to the yokeless topology, and consequently, the machine can be controlled very easily to have very low torque ripples even under fault conditions.

Further, there is little concern about demagnetizing the magnets as the field due to PMs is perpendicular to the field due to currents in the windings. Permanent magnets that are embedded in the stator are all magnetized in the same circumferential direction. During construction of the machine, this is highly beneficial as the stator can be built first, and then magnetized externally. Also, cheaper magnets, such as AlNiCo magnets, can be used without concerns about demagnetizing them.

In addition, in many embodiments, the magnets and the coils can be stationary. Only the rotors rotate, which makes the machine very robust. In an alternative embodiment, the rotors are stationary and the stator rotates in use.

The device is modular, easy to assemble, and can be easily controlled. The modular nature of the device allows it to be operated with multiple phases easily and can be designed to be highly fault-tolerant. From a performance point of view, the device has very low torque ripples and a high torque density, making it a suitable choice for many high precision applications.

FSMs of the subject invention are advantageous in several applications, including, but not limited to, hybrid vehicles, electric ships (e.g., naval and other marine vessels), aircrafts, washing machines, hydroelectric generators, wind generators, pumps, compressors, and robots.

EXEMPLIFIED EMBODIMENTS

The invention includes, but is not limited to, the following embodiments:

Embodiment 1

A flux-switching machine (FSM), comprising:
a first rotor;
a second rotor; and
a stator disposed between the first rotor and the second rotor,
wherein the stator has a ring shape with an annular opening.

Embodiment 2

The FSM according to embodiment 1, wherein the stator comprises at least two permanent magnets and a coil wrapped around each permanent magnet (the coil does not have to be wrapped around the magnet such that the coil is in contact with the magnet; a portion of the stator may be disposed therebetween).

Embodiment 3

The FSM according to embodiment 2, wherein all permanent magnets of the FSM are magnetized in the same circumferential direction.

Embodiment 4

The FSM according to any of embodiments 1-3,
wherein the first rotor is disposed within the annular opening of the stator,
wherein the second rotor has a ring shape with an annular opening, and
wherein the stator is disposed within the annular opening of the second rotor.

Embodiment 5

The FSM according to any of embodiments 1-4,
wherein the first rotor comprises rotor teeth on a surface thereof facing the stator,
wherein the first rotor comprises teeth gaps between the rotor teeth of the first rotor,
wherein the second rotor comprises rotor teeth on a surface thereof facing the stator,
wherein the second rotor comprises teeth gaps between the rotor teeth of the second rotor,
wherein the first rotor and the second rotor are displaced from each other by half a pole pitch such that the rotor teeth of the first rotor are aligned with the teeth gaps of the second rotor and the rotor teeth of the second rotor are aligned with the teeth gaps of the first rotor.

Embodiment 6

The FSM according to any of embodiments 1-5, wherein the FSM is yokeless.

Embodiment 7

The FSM according to any of embodiments 2-6, wherein the FSM is configured such that, in use, the stator, all magnets, and all coils are stationary while the rotors rotate.

Embodiment 8

The FSM according to any of embodiments 2-7, wherein the stator comprises at least five permanent magnets.

Embodiment 9

The FSM according to any of embodiments 1-8, wherein the number of phases of the FSM is at least three.

Embodiment 10

The FSM according to any of embodiments 1-9, wherein the stator is encapsulated in a non-magnetic encapsulating material.

Embodiment 11

The FSM according to any of embodiments 2-9, wherein the stator, all permanent magnets, and all coils are encapsulated in a non-magnetic encapsulating material.

Embodiment 12

The FSM according to any of embodiments 10-11, wherein the non-magnetic encapsulating material comprises a thermally-conducting resin.

Embodiment 13

The FSM according to any of embodiments 2-11, wherein each permanent magnet comprises NdFeB.

Embodiment 14

The FSM according to any of embodiments 1-13, wherein the stator comprises steel.

Embodiment 15

The FSM according to any of embodiments 1-14, wherein the first rotor comprises steel.

Embodiment 16

The FSM according to any of embodiments 1-15, wherein the second rotor comprises steel.

Embodiment 17

The FSM according to any of embodiments 1-3 and 4-16,
wherein the first rotor has a ring shape,
wherein the second rotor has a ring shape,
wherein the FSM has an axial arrangement, such that neither the first rotor nor the second rotor is disposed within the annular opening of the stator,
wherein the first rotor is disposed on one side of the stator in the axial direction and the second rotor is disposed on the other side the stator in the axial direction.

Embodiment 18

The FSM according to any of embodiments 1, 4-6, 9-10, 12, and 14-17, wherein the stator comprises at least two direct current (DC) field coils and a phase winding coil wrapped around each DC field coil (the phase winding coil does not have to be wrapped around the DC field coil such that the phase winding coil is in contact with the DC field coil; a portion of the stator may be disposed therebetween).

Embodiment 19

The FSM according to embodiment 18, wherein the positive-negative axis orientation of all DC field coils are in the same radial direction.

Embodiment 20

The FSM according to any of embodiments 1, 4-6, 9-10, 12, and 14-17, wherein the stator comprises at least two high-temperature superconducting direct current (HTSCDC) field coils and a phase winding coil wrapped around each HTSCDC field coil (the phase winding coil does not have to be wrapped around the HTSCDC field coil such that the phase winding coil is in contact with the HTSCDC field coil; a portion of the stator may be disposed therebetween).

Embodiment 21

The FSM according to embodiment 20, wherein the positive-negative axis orientation of all HTSCDC field coils are in the same radial direction.

Embodiment 22

The FSM according to any of embodiments 1, 4-6, 9-10, 12, and 14-17, wherein the stator comprises at least two DC field coil/permanent magnet hybrid combinations and a phase winding coil wrapped around each DC field coil/permanent magnet hybrid combination (the coil does not have to be wrapped around the DC field coil/permanent magnet hybrid combination such that the coil is in contact with the DC field coil/permanent magnet hybrid combination; a portion of the stator may be disposed therebetween).

Embodiment 23

The FSM according to embodiment 21, wherein each DC field coil/permanent magnet hybrid combination comprises a DC field coil and a permanent magnet (the magnet can be disposed, e.g., within the DC field coil or adjacent to the DC field coil).

Embodiment 24

The FSM according to any of embodiments 22-23, wherein the positive-negative axis orientation of all DC field coils are in the same radial direction.

Embodiment 25

The FSM according to any of embodiments 22-24, wherein all permanent magnets of the FSM are magnetized in the same circumferential direction.

Embodiment 26

A method of manufacturing a flux-switching machine (FSM), comprising:
providing a stator between a first rotor and a second rotor, wherein the stator has a ring shape with an annular opening.

Embodiment 27

The method according to embodiment 26, wherein providing the stator comprises:
providing at least two permanent magnets;
providing a coil wound around each permanent magnet; and
providing the permanent magnets having coils wound around them within the stator.

Embodiment 28

The method according to embodiment 27, wherein all permanent magnets of the FSM are magnetized in the same circumferential direction.

Embodiment 29

The method according to any of embodiments 26-28, wherein the second rotor has a ring shape with an annular opening.

Embodiment 30

The method according to embodiment 29, wherein providing the stator between the first rotor and the second rotor comprises disposing the first rotor within the annular opening of the stator and disposing the stator within the annular opening of the second rotor.

Embodiment 31

The method according to any of embodiments 26-30, wherein the first rotor and the second rotor each comprises rotor teeth facing the stator and teeth gaps between the rotor teeth, and
wherein the second rotor is provided such that it is displaced from the first rotor by half a pole pitch such that the rotor teeth of the first rotor are aligned with the teeth gaps of the second rotor and the rotor teeth of the second rotor are aligned with the teeth gaps of the first rotor.

Embodiment 32

The method according to any of embodiments 26-31, further comprising:
encapsulating the stator in a non-magnetic encapsulating material, prior to providing the stator between the first rotor and the second rotor.

Embodiment 33

The method according to any of embodiments 27-31, further comprising:
encapsulating the stator, the permanent magnets, and the coils in a non-magnetic encapsulating material, prior to providing the stator between the first rotor and the second rotor.

Embodiment 34

The method according to any of embodiments 27-33, further comprising:
magnetizing the permanent magnets such that all permanent magnets of the FSM are magnetized in the same circumferential direction.

Embodiment 35

The method according to embodiment 34, wherein magnetizing the permanent magnets is performed after encapsulating the stator (and the permanent magnets and the coils, if present) in the non-magnetic encapsulating material.

Embodiment 36

The method according to any of embodiments 26-35, wherein the FSM is yokeless.

Embodiment 37

The method according to any of embodiments 27-36, wherein the FSM is configured such that, in use, the stator, all magnets, and all coils are stationary while the rotors rotate.

Embodiment 38

The method according to any of embodiments 27-37, wherein the stator comprises at least five permanent magnets.

Embodiment 39

The method according to any of embodiments 26-38, wherein the number of phases of the FSM is at least three.

Embodiment 40

The method according to any of embodiments 32-33, wherein the non-magnetic encapsulating material comprises a thermally-conducting resin.

Embodiment 41

The method according to any of embodiments 27-40, wherein each permanent magnet comprises NdFeB.

Embodiment 42

The method according to any of embodiments 26-41, wherein the stator comprises steel.

Embodiment 43

The method according to any of embodiments 26-42, wherein the first rotor comprises steel.

Embodiment 44

The method according to any of embodiments 26-43, wherein the second rotor comprises steel.

Embodiment 45

The method according to any of embodiments 26-29 and 31-44,
wherein the first rotor has a ring shape,
wherein the second rotor has a ring shape,
wherein the FSM has an axial arrangement, such that neither the first rotor nor the second rotor is disposed within the annular opening of the stator,
wherein providing the stator between the first rotor and the second rotor comprises disposing the first rotor on one side of the stator in the axial direction and disposing the second rotor on the other side of the stator in the axial direction.

Embodiment 46

The method according to any of embodiments 26, 29-32, 36, 39-40, and 42-45, wherein providing the stator comprises:
providing at least two direct current (DC) field coils;
providing a phase winding coil wound around each DC field coil (the phase winding coil does not have to be wrapped around the DC field coil such that the phase winding coil is in contact with the DC field coil; a portion of the stator may be disposed therebetween); and
providing the DC field coils having phase winding coils wound around them within the stator.

Embodiment 47

The method according to embodiment 46, wherein the positive-negative axis orientation of all DC field coils are in the same radial direction.

Embodiment 48

The method according to any of embodiments 26, 29-32, 36, 39-40, and 42-45, wherein providing the stator comprises:
providing at least two high-temperature superconducting direct current (HTSCDC) field coils;
providing a phase winding coil wound around each HTSCDC field coil (the phase winding coil does not have to be wrapped around the HTSCDC field coil such that the phase winding coil is in contact with the HTSCDC field coil; a portion of the stator may be disposed therebetween); and
providing the HTSCDC field coils having phase winding coils wound around them within the stator.

Embodiment 49

The method according to embodiment 48, wherein the positive-negative axis orientation of all HTSCDC field coils are in the same radial direction.

Embodiment 50

The method according to any of embodiments 26, 29-32, 36, 39-40, and 42-45, wherein providing the stator comprises:
providing at least two DC field coil/permanent magnet hybrid combinations;
providing a phase winding coil wound around each DC field coil/permanent magnet hybrid combination (the phase winding coil does not have to be wrapped around the DC field coil/permanent magnet hybrid combination such that the phase winding coil is in contact with the DC field coil/permanent magnet hybrid combination; a portion of the stator may be disposed therebetween); and
providing the DC field coil/permanent magnet hybrid combinations having phase winding coils wound around them within the stator.

Embodiment 51

The method according to embodiment 50, wherein each DC field coil/permanent magnet hybrid combination comprises a DC field coil and a permanent magnet (e.g., disposed within the DC field coil or adjacent to the DC field coil).

Embodiment 52

The method according to any of embodiments 50-51, wherein the positive-negative axis orientation of all DC field coils are in the same radial direction.

Embodiment 53

The method according to any of embodiments 50-52, wherein all permanent magnets of the FSM are magnetized in the same circumferential direction.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

An FSPMM according to an embodiment of the subject invention was proposed for use with advanced propulsion systems of large marine vessels (e.g., naval vessels). Back-emf and torque of the FSPMM was simulated using finite-element analysis. The FSPMM of the subject invention used for analysis was a 13-phase, 13-slot/17-pole motor having 13 PMs. A cross-sectional diagram of the FSPMM is shown in FIG. 6.

The FSPMM has an inner rotor 321 and an outer rotor 325; each rotor is made of laminated silicon steel, and each has 17 teeth. The number of teeth can determine the number of poles of the machine. The stator is modular and each module is made of laminated silicon steel with PMs embedded in it. Phase coils are wound around the silicon steel stator module such that the current produces magnetic field that is perpendicular to the magnetic field of the PMs. The stator is yokeless (does not have any back iron). All PMs are magnetized in the same circumferential direction. The rotors are arranged such that the tooth of one rotor is displaced by half a tooth-pitch from the corresponding tooth on the other rotor. This ensures symmetry for flux flow. Both rotors are connected to the same common shaft. The stator modules are held together by a non-magnetic material.

Figure 7:
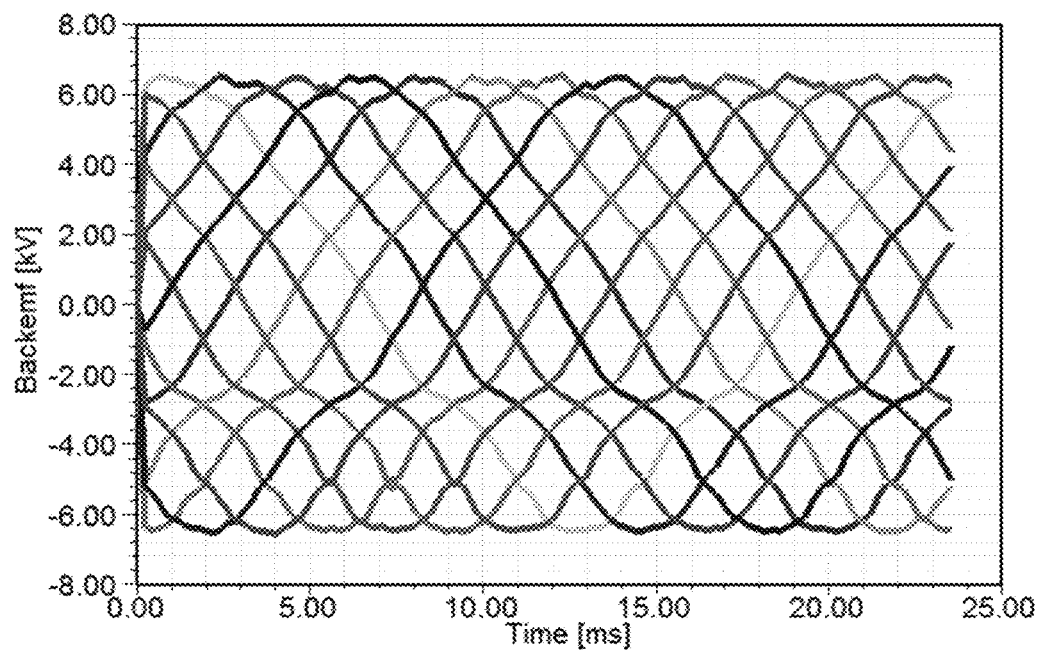
FIG. 7 is a plot showing back-emf as a function of time.
Figure 8:
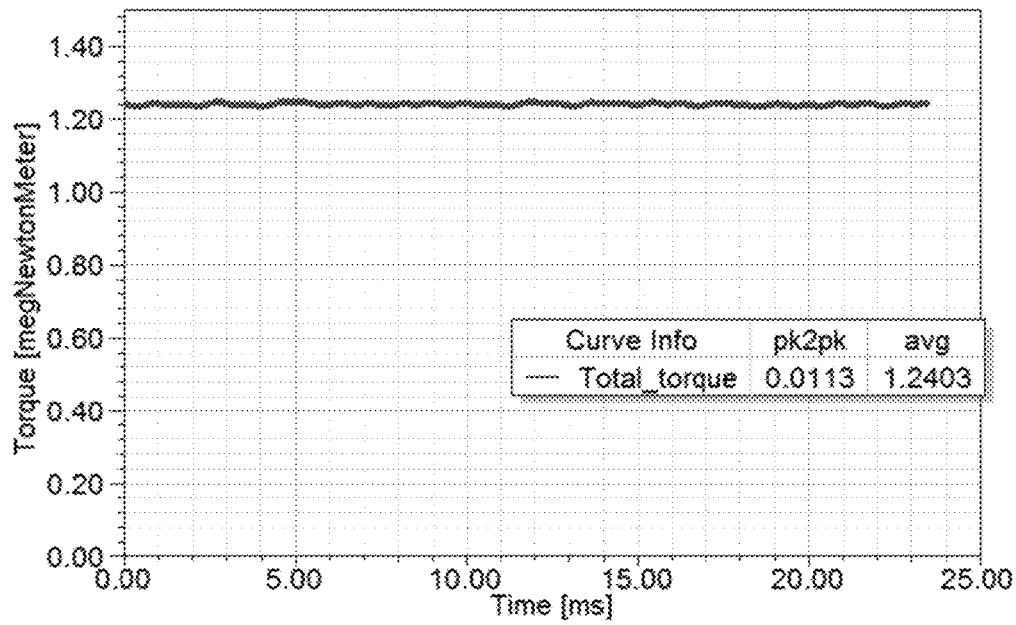
FIG. 8 is a plot showing torque as a function of time.

FIG. 7 shows a plot of back-emf versus time for the FSPMM of the subject invention, and FIG. 8 shows a plot of torque versus time for the FSPMM. The FSPMM is designed for a 19 MW propulsion application, and the results were simulated using finite-element analysis. These waveforms were obtained maintaining the motor speed at 150 rpm. Referring to FIG. 7, the back-emf is almost sinusoidal. Better sinusoidal waveforms can be achieved through a complete optimization of the proposed FSPMM.

Referring to FIG. 8, the torque ripple is very low. It is less than 1% of the average torque and is highly desirable to maintain low mechanical vibrations. This allows the air-gaps in the machine to be very small.

Figure 9:
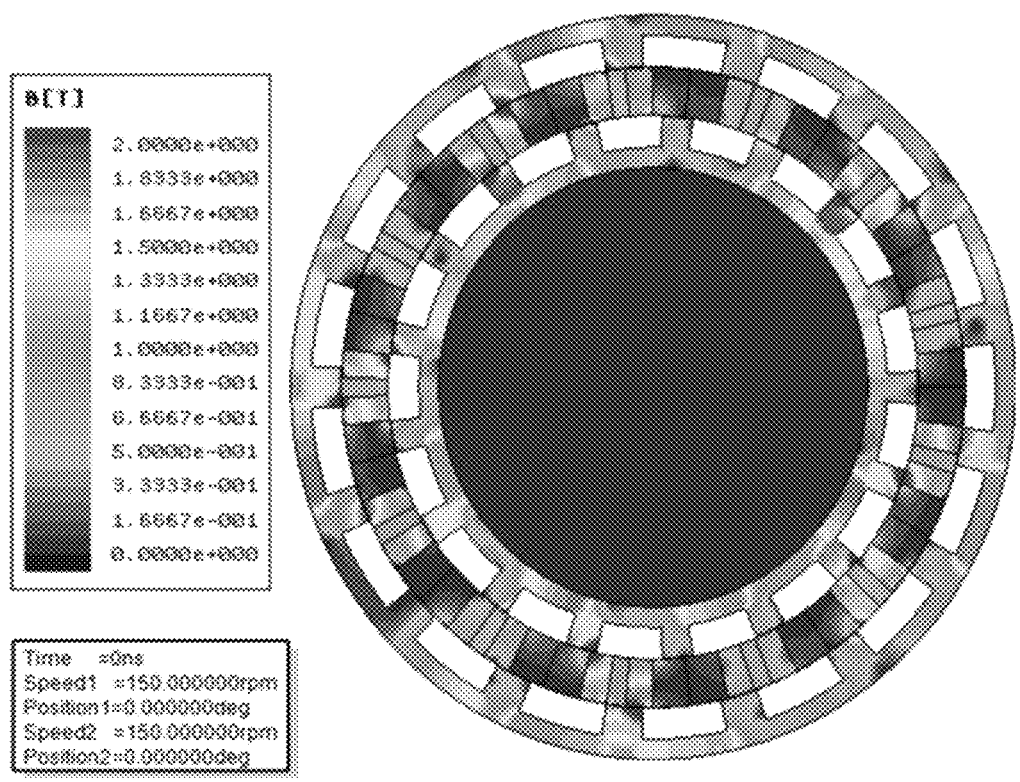
FIG. 9 is a cross-sectional diagram showing the magnitude of the B field for motor according to an embodiment of the subject invention.

FIG. 9 shows a plot of the magnitude of B-field of the entire FSPMM when it is operating at full load and rated speed. The FSPMM is designed such that the magnitude of B field in the stator and rotor is less than 2 T in order to prevent saturation and excessive core losses.

Electrical motors form the core of advanced propulsion systems that are considered for naval vessels. A summary of motors that have been considered for this application is provided in [1] and [2]. Advanced induction motors, permanent magnet (PM) motors, and high temperature superconducting motors can be suitable for propulsion applications. These motors have advantages and disadvantages discussed in [2], but PM motors have the most advantages.

The FSPMM of the subject invention overcomes the disadvantages of conventional FSPMMs and has a high torque density matching surface-mounted PM (SMPM) and interior PM (IPM) machines, which is more than 40% higher than conventional flux-switching machines. The FSPMM of the subject invention is an excellent candidate for naval propulsion and other applications requiring high torque density. As the PMs are not rotating, it can be easier to cool them and thus, operate the machine at a much higher saturation level with easy thermal management.

Example 2

The FSPMM of Example 1 was compared with the advanced induction machine (AIM) as described in [3]. The AIM of [3] was developed by ALSTOM for the U.S. Navy. While exact specifications for this machine are unavailable publicly, an estimate of the machine parameters is available in [3]. Table 1 shows a comparison of the parameters of the FSPMM of the subject invention (labeled "Proposed FSM" in Table 1) and the AIM of [3] (labeled "Conventional" in Table 1). It can be seen that the stator outer diameter, stack length, air-gap, speed, and output power are kept constant for the two machines for a fair comparison. All the parameters shown are only of the active machine. Volume and weight of the external housing, cooling assembly, and others are not included in this comparison.

TABLE 1

Comparison of FSPMM of the subject invention and AIM of [3]

| Parameter | Conventional | Proposed FSM |
| --- | --- | --- |
| Phases | 15 | 13 |
| Poles | 12 | 17 |
| Speed (rpm) | 150 | 150 |
| Output Power (MW) | 19 | 19.2 |
| Current density (A/mm$^2$) | 3.5 | 2.8 |
| Stator cooling | Air | Air |
| Outer Diameter (m) | 3.5 | 3.5 |
| Stack length (m) | 1.41 | 1.41 |
| Airgap length (mm) | 8 | 8 (each airgap = 4) |
| Total weight of active material (kg) | 51e3 | 42e3 |
| Magnet weight (kg) | NA | 2.6e3 |
| Power factor | 0.85 | 0.92 |

The FSPMM of the subject invention weighs almost 9 tons less than the AIM does. The current density required is also less in the FSPMM. It is also likely that the FSPMM has better efficiency than the AIM. This is because the major component of the losses (i.e., the copper loss) is reduced as the FSPMM replaces many of the conductors with PMs. Another point to note is the power factor of the FSPMM of the subject invention is significantly higher than that of the AIM. This leads to less stress on the converters supplying power to the machine. The FSPMM of the subject invention exhibits all the advantages of a PM-based motor against an induction motor, such as easy controllability, straightforward start and run at all load levels, and lower ripple. In addition, the FSPMM of the subject invention is different from other PM machines because the PMs are not moving. Thermal management of the PMs is easier, and the machine can be operated at much higher capacity without concern for demagnetizing the PMs.

The FSPMM of the subject invention has significant advantages over the conventional AIM for propulsion applications. The same power output can be achieved for a lower weight of the machine, while also giving better efficiency and power factor. Additionally, thermal management of the PMs is easier, and the machine is more rugged as the moving part is only steel.

Example 3

An FSPMM according to an embodiment of the subject invention was compared with a surface-mounted PM (SMPM) and an internal PM (IPM) machine for propulsion applications that require power levels of up to 6 MW. Parameters of the SMPM and IPM machines were selected from [4], in which these two motors have been compared for marine applications. The FSPMM of the subject invention used for analysis was a 5-phase, 15-slot/18-pole motor having 15 PMs. The cross-sectional diagram of the FSPMM is similar to that shown in FIG. 6, but with a different number of phases, slots, poles, rotor teeth, and PMs.

The FSPMM has an inner rotor and an outer rotor; each rotor is made of laminated silicon steel, and each has 18 teeth. The stator is modular and each module is made of laminated silicon steel with PMs embedded in it. Phase coils are wound around the silicon steel stator module such that the current produces magnetic field that is perpendicular to the magnetic field of the PMs. The stator is yokeless, and all PMs are magnetized in the same circumferential direction. The rotors are arranged such that the tooth of one rotor is displaced by half a tooth-pitch from the corresponding tooth on the other rotor. Both rotors are connected to the same common shaft. The stator modules are held together by a non-magnetic material.

Table 2 shows a comparison of the parameters of the 5-phase, 15-slot/18-pole FSPMM of the subject invention (labeled "Proposed FSM" in Table 2) and the SMPM (labeled "Conventional A" in Table 2) and IPM (labeled "Conventional B" in Table 2) machines of [4]. The FSPMM of the subject invention has significant advantages over both the SMPM and IPM machines. For the same volume and space constraints and similar air-gaps, the proposed FSPMM has much higher torque density than both SMPM machine and IPM machine. Five phases of the proposed FSPMM have been considered in order to provide fault-tolerance to the motor. While the weight of the motors is not available in [4], knowledge from the previous simulations for the 19 MW application implies that the weight of the FSPMM of the subject invention will be at a comparable level to that of the SMPM motor and the IPM motor.

TABLE 2

Comparison of FSPMM of the subject invention, SMPM of [4], and IMP of [4]

| Parameter | Conventional A | Conventional B | Proposed FSM |
| --- | --- | --- | --- |
| Output Power (MW) | 6.8 | 6.75 | 7.5 |
| Phases | 3 | 3 | 5 |
| Stator slots | 120 | 96 | 15 |
| Poles | 16 | 8 | 18 |
| Speed (rpm) | 170 | 170 | 170 |
| RMS current | 806 | 876 | 806 |
| Current density (A/mm$^2$) | 4 | 5 | 4 |
| Stator cooling | Air | Air | Air |
| Torque Density | 56.6 | 48.3 | 62.6 |
| Outer Diameter (m) | 1.75 | 1.89 | 1.75 |
| Stack length (m) | 2.78 | 2.78 | 2.78 |
| Overall volume (m$^3$) | 6.7 | 7.9 | 6.7 |
| Airgap length (mm) | 6 | 4 | 6 (each airgap = 3) |

Example 4

An FSPMM according to an embodiment of the subject invention was proposed for use with wind turbines (e.g., as a generator for off-shore wind turbines). Back-emf and torque of the FSPMM was simulated using finite-element analysis. The FSPMM of the subject invention used for analysis was a 5-phase, 45-slot/81-pole motor having 45 PMs. A cross-sectional diagram of the FSPMM is shown in FIG. 5. The motor has an air-gap length of 5 mm for each air-gap.

The FSPMM has an inner rotor 321 and an outer rotor 325; each rotor is made of steel, and each has 81 teeth. The number of teeth can determine the number of poles of the machine. The stator is modular and each module is made of steel with PMs embedded in it. Phase coils are wound around the steel stator module such that the current produces magnetic field that is perpendicular to the magnetic field of the PMs. The stator is yokeless, and all PMs are magnetized in the same circumferential direction. The rotors are arranged such that the tooth of one rotor is displaced by half a tooth-pitch from the corresponding tooth on the other rotor.

Figure 10:
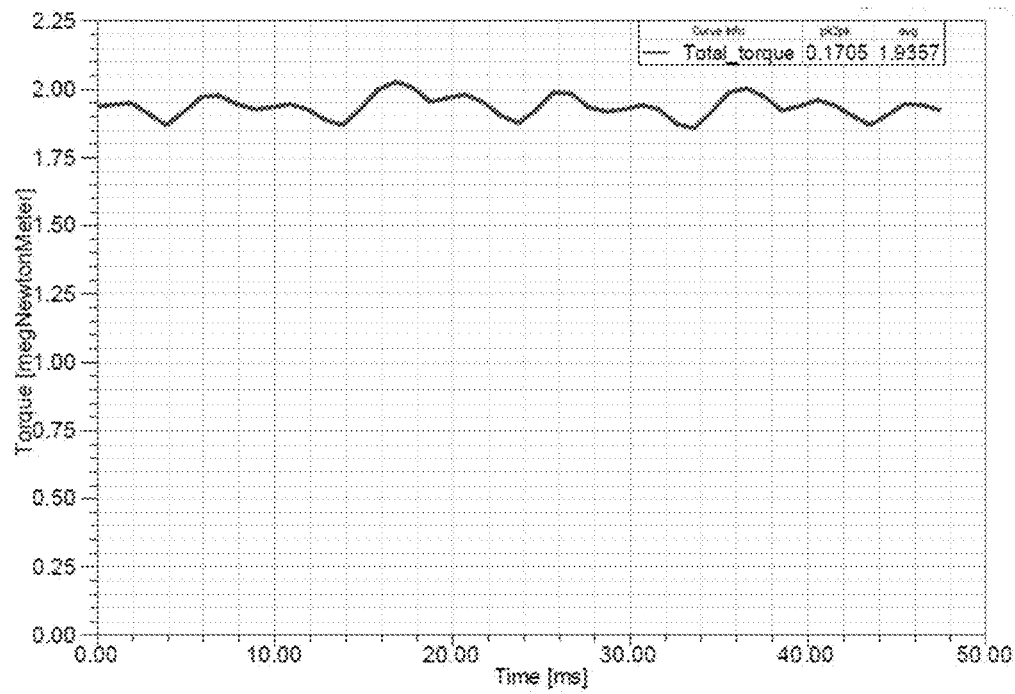
FIG. 10 is a plot showing torque as a function of time.
Figure 11:
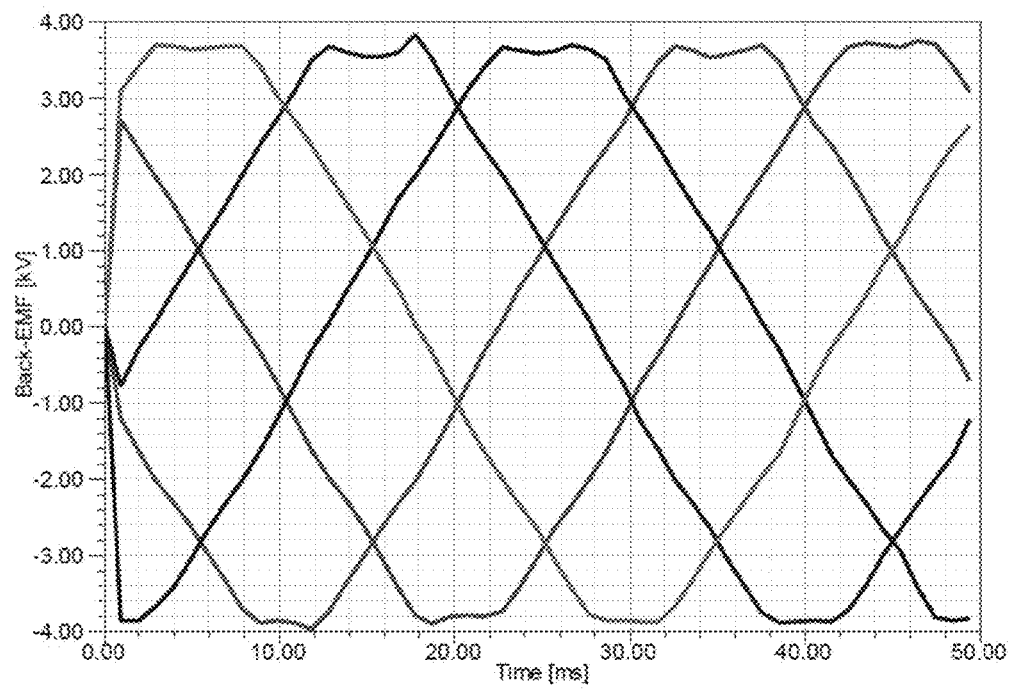
FIG. 11 is a plot showing back-emf as a function of time.

FIG. 10 shows a plot of back-emf versus time for the FSPMM, and FIG. 11 shows a plot of torque versus time for the FSPMM. The FSPMM is designed for a 3 MW generator application, and the results were simulated using finite-element analysis. These waveforms were obtained maintaining the motor speed at 15 rpm. Referring to FIG. 10, the back-emf is somewhat sinusoidal. Referring to FIG. 11, the torque ripple is low.

Example 5

The FSPMM of Example 4 was compared with a direct-drive PM synchronous machine (PMSM). Table 3 shows a comparison of the parameters of the FSPMM of the subject invention (labeled "Proposed FSM" in Table 3) and the direct-drive SMPM (labeled "direct-drive PMSM" in Table 3).

TABLE 3

Comparison of FSPMM of the subject invention and direct-drive PMSM

| Parameter | Direct-Drive PMSM | Proposed FSM |
| --- | --- | --- |
| Phases | 3 | 5 |
| Slots | 480 | 45 |
| Poles | 160 | 81 |
| Speed (rpm) | 15 | 15 |
| Power (MW) | 3 | 3 |
| Outer Diameter (m) | 5 | 4.5 |
| Stack length (m) | 1.2 | 1.2 |
| Airgap length (mm) | 5 | 5 (each airgap) |
| Magnet weight (kg) | 1.7 | 1.7 |
| Copper weight (ton) | 4.3 | 8.7 |
| Steel weight (ton) | 18.1 | 19.5 |
| Total weight (ton) | 24.1 | 29.9 |

Example 6

An FSPMM according to an embodiment of the subject invention was proposed for use with wind turbines (e.g., as a generator for off-shore wind turbines). Back-emf and torque of the FSPMM was simulated using finite-element analysis. The FSPMM of the subject invention used for analysis was a 5-phase, 45-slot/81-pole motor having 45 PMs. A cross-sectional diagram of the FSPMM is shown in FIG. 5. The motor differs from that of Example 4 by having an air-gap length of 2.5 mm for each air-gap.

The FSPMM has an inner rotor 321 and an outer rotor 325; each rotor is made of steel, and each has 81 teeth. The stator is modular and each module is made of steel with PMs embedded in it. Phase coils are wound around the steel stator module such that the current produces magnetic field that is perpendicular to the magnetic field of the PMs. The stator is yokeless, and all PMs are magnetized in the same circumferential direction. The rotors are arranged such that the tooth of one rotor is displaced by half a tooth-pitch from the corresponding tooth on the other rotor.

Figure 12:
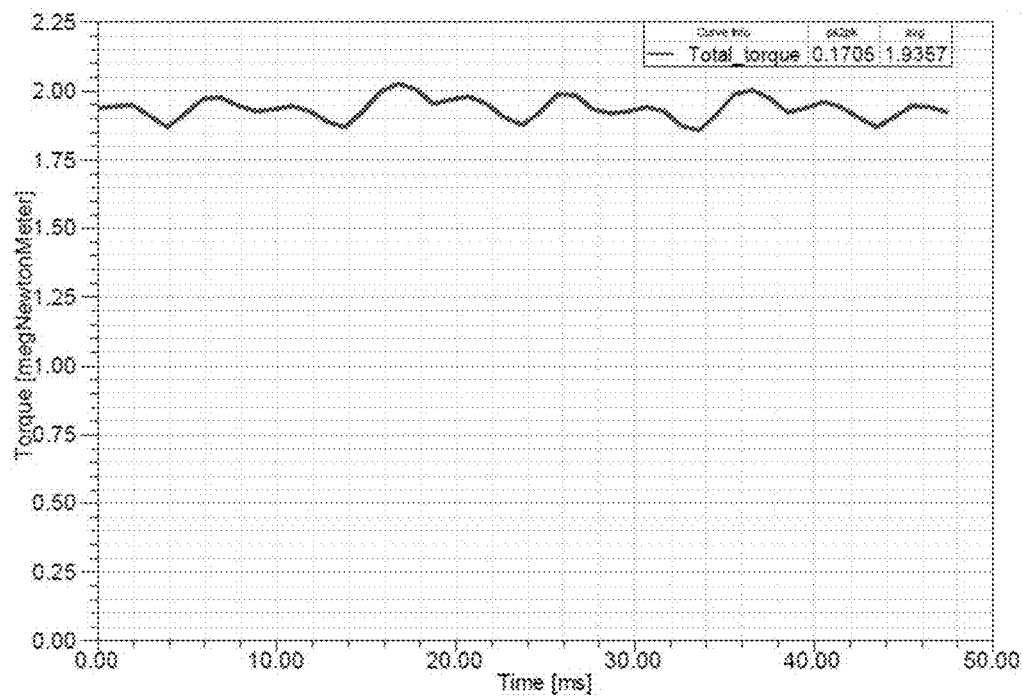
FIG. 12 is a plot showing torque as a function of time.
Figure 13:
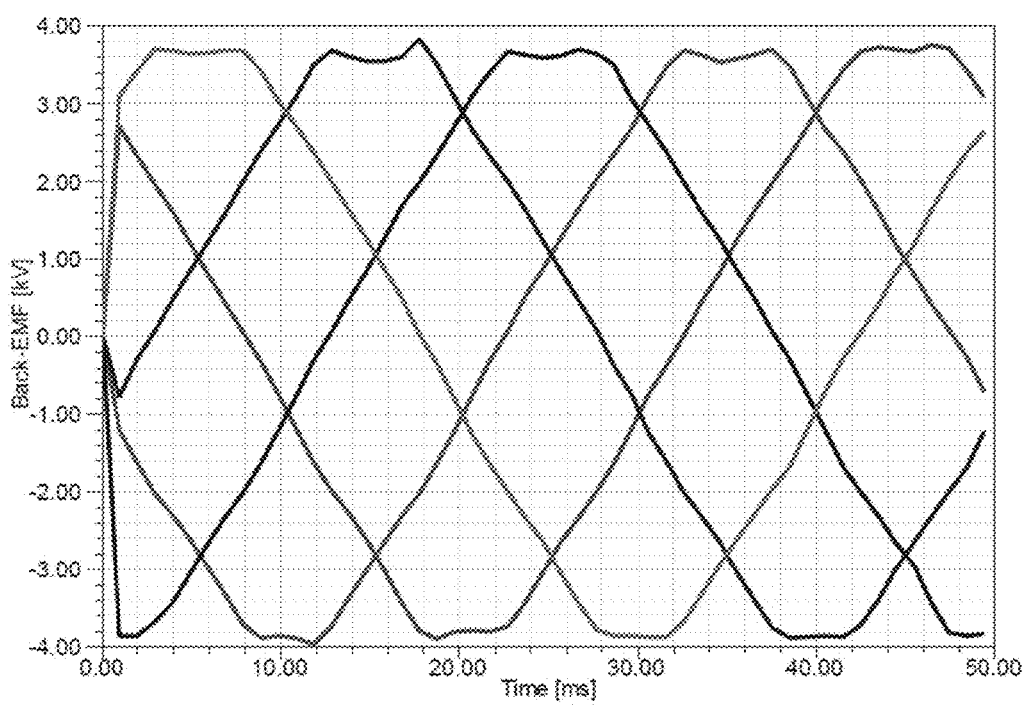
FIG. 13 is a plot showing back-emf as a function of time.

FIG. 12 shows a plot of back-emf versus time for the FSPMM, and FIG. 13 shows a plot of torque versus time for the FSPMM. The FSPMM is designed for a 3 MW generator application, and the results were simulated using finite-element analysis. These waveforms were obtained maintaining the motor speed at 15 rpm. Referring to FIG. 12, the back-emf is somewhat sinusoidal. Referring to FIG. 13, the torque ripple is low.

Example 7

The FSPMM of Example 6 was compared with a direct-drive PM synchronous machine (PMSM). Table 4 shows a comparison of the parameters of the FSPMM of the subject invention (labeled "Proposed FSM" in Table 4) and the direct-drive SMPM (labeled "direct-drive PMSM" in Table 4).

TABLE 4

Comparison of FSPMM of the subject invention and direct-drive PMSM

| Parameter | Direct-Drive PMSM | Proposed FSM |
| --- | --- | --- |
| Phases | 3 | 5 |
| Slots | 480 | 45 |
| Poles | 160 | 81 |
| Speed (rpm) | 15 | 15 |
| Power (MW) | 3 | 3 |
| Outer Diameter (m) | 5 | 4.5 |
| Stack length (m) | 1.2 | 1.2 |
| Airgap length (mm) | 5 | 2.5 (each airgap) |
| Magnet weight (kg) | 1.7 | 1.7 |
| Copper weight (ton) | 4.3 | 8.7 |
| Steel weight (ton) | 18.1 | 19.5 |
| Total weight (ton) | 24.1 | 29.9 |

Example 8

An FSPMM according to an embodiment of the subject invention was proposed with an output power of 2 kilowatts (kW) or about 2 kW. The device had magnets all magnetized in the same circumferential direction, and had the parameters shown in Table 5. For a device with higher or lower power, the parameters can be scaled accordingly.

TABLE 5

Parameters of FSPMM

| Parameter | Symbol | Value |
| --- | --- | --- |
| Outer radius | $r_o$ | 59 mm |
| Stator outer radius | $r_{so}$ | 48 mm |
| Stator inner radius | $r_{si}$ | 25 mm |
| Shaft radius | $r_{sh}$ | 14 mm |
| Stack length | L | 100 mm |
| Rotor tooth pitch | $\tau_{rp}$ | 40° |
| Rotor tooth width | $w_{rt}$ | 16° |
| Rotor tooth height | $h_{rt}$ | 5 mm |

TABLE 5-continued

Parameters of FSPMM

| Parameter | Symbol | Value |
| --- | --- | --- |
| Rotor back-iron height | $h_{rb}$ | 5 mm |
| Air gap | g | 1 mm |
| Stator tooth width | $w_{st}$ | 13.85° |
| PM width | $w_m$ | 6.3° |

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] M. R. Patel, "Chapter 8: Propulsion Motors" in Shipboard Propulsion, Power Electronics, and Ocean Energy, CRC Press, 2012.

[2] B. A. Bassham, "An Evaluation Of Electric Motors For Ship Propulsion" M.S. thesis, Naval Postgraduate School., Ensign, United States Navy, BEE, Auburn University, 2002.

[3] C. Chryssostomidis, F. Hover, G. Karniadakis, J. Kirtley, S. Leeb, and M. Triantafyllou, "Quarterly Report On the Contributions from MIT To the Electric Ship Research and Development Consortium," Report submitted by MIT to Office of Naval Research, 2008.

[4] R. Lateb, N. Takorabet, F. Meibody-Tabar, A. Mirzaian, J. Enon, and A. Sarribouette, "Performances comparison of induction motors and surface mounted PM motor for POD marine propulsion," Industry Applications Conference, 2005. Fortieth IAS Annual Meeting. Conference Record of the 2005, vol. 2, no., pp. 1342-1349 Vol. 2, 2-6 Oct. 2005.

[5] A. Gandhi and L. Parsa, U.S. patent application Ser. No. 13/734,404, "Flux-Switching Linear Permanent Magnet Machine with Yokeless Translator," filed Jan. 4, 2013.

[6] W. Min, J. Chen, Z. Zhu, Y. Zhu, M. Zhang, and G. Duan, "Optimization and comparison of novel e-core and c-core linear switched flux pm machines," Magnetics, IEEE Transactions on, vol. 47, no. 8, pp. 2134-2141, August 2011.

[7] J. Floresta, X. T. Wang, and D. Bobelis, "High performance slotless electric motor and method for making same," Patent WO/2002/015 229, February, 2002.

[8] S. Dwari and L. Parsa, "An optimal control technique for multiphase pm machines under open-circuit faults," vol. 55, no. 5, pp. 1988-1995, May 2008.

[9] W. Min, J. Chen, Z. Zhu, Y. Zhu, M. Zhang, and G. Duan, "Optimization and comparison of novel e-core and c-core linear switched flux pm machines," Magnetics, IEEE Transactions on, vol. 47, no. 8, pp. 2134-2141, August 2011.

We claim:

1. A flux-switching permanent magnet machine (FSPMM), comprising:
   a first rotor;
   a second rotor; and
   a stator disposed between the first rotor and the second rotor, wherein the stator comprises a plurality of slots, a plurality of permanent magnets, and a coil wrapped around each permanent magnet,
   wherein the stator has a ring shape with an annular opening,
   wherein all permanent magnets of the FSPMM are magnetized in the same circumferential direction of the stator,
   wherein each coil that is wrapped around a permanent magnet is disposed in a slot of the plurality of slots of the stator,
   wherein each coil directly faces the first rotor and the second rotor without a back-iron interposed therebetween,
   wherein each slot of the plurality of slots of the stator has a width configured to focus flux, from the permanent magnet around which the coil disposed in said slot is wrapped, across a first airgap separating the stator and the first rotor,
   wherein the width of each slot is larger than the first airgap,
   wherein the first airgap is a shortest radial distance between the stator and the first rotor, and
   wherein adjacent permanent magnets of the FSPMM are not connected via a yoke.

2. The FSPMM according to claim 1,
   wherein the first rotor is disposed within the annular opening of the stator, wherein the second rotor has a ring shape with an annular opening, and wherein the stator is disposed within the annular opening of the second rotor.

3. The FSPMM according to claim 2,
   wherein the first rotor comprises rotor teeth on a surface thereof facing the stator, wherein the first rotor comprises teeth gaps between the rotor teeth of the first rotor, wherein the second rotor comprises rotor teeth on a surface thereof facing the stator, wherein the second rotor comprises teeth gaps between the rotor teeth of the second rotor, and
   wherein the first rotor and the second rotor are displaced from each other by half a pole pitch such that the rotor teeth of the first rotor are aligned with the teeth gaps of the second rotor and the rotor teeth of the second rotor are aligned with the teeth gaps of the first rotor.

4. The FSPMM according to claim 1, wherein the stator comprises at least five permanent magnets, and wherein the number of phases of the FSPMM is at least three.

5. The FSPMM according to claim 1, wherein the stator, all permanent magnets, and all coils are encapsulated in a non-magnetic encapsulating material.

6. The FSPMM according to claim 5, wherein the non-magnetic encapsulating material comprises a thermally-conducting resin.

7. The FSPMM according to claim 1, wherein each permanent magnet comprises NdFeB or AlNiCo,
   wherein the stator comprises steel, wherein the first rotor comprises steel, and wherein the second rotor comprises steel.

8. The FSPMM according to claim 1,
   wherein the first rotor has a ring shape, wherein the second rotor has a ring shape, wherein the FSPMM has an axial arrangement, such that neither the first rotor nor the second rotor is disposed within the annular opening of the stator, and
   wherein the first rotor is disposed on one side of the stator in the axial direction and the second rotor is disposed on the other side of the stator in the axial direction.

9. The FSPMM according to claim 8,
   wherein the first rotor comprises rotor teeth on a surface thereof facing the stator, wherein the first rotor comprises teeth gaps between the rotor teeth of the first rotor, wherein the second rotor comprises rotor teeth on a surface thereof facing the stator, wherein the second rotor comprises teeth gaps between the rotor teeth of the second rotor, and
   wherein the first rotor and the second rotor are displaced from each other by half a pole pitch such that the rotor teeth of the first rotor are aligned with the teeth gaps of the second rotor and the rotor teeth of the second rotor are aligned with the teeth gaps of the first rotor.

10. The FSPMM according to claim 8, wherein the stator, all permanent magnets, and all coils are encapsulated in a non-magnetic encapsulating material.

11. The FSPMM according to claim 1, wherein the width of each slot of the plurality of slots of the stator is also configured to focus flux, from the permanent magnet around which the coil disposed in said slot is wrapped, across a second airgap separating the stator and the second rotor,
    wherein the second airgap is a shortest radial distance between the stator and the second rotor, and
    wherein a smallest width of each slot of the plurality of slots of the stator is greater than both the first airgap and the second airgap.

12. The FPSMM according to claim 11, wherein each coil is wrapped around its respective permanent magnet in a circumferential direction of the stator.

13. A method of manufacturing a flux-switching permanent magnet machine (FSPMM), comprising:
    providing a plurality of permanent magnets;
    providing the permanent magnets within a stator;
    providing a coil wound around each permanent magnet; and
    providing the stator between a first rotor and a second rotor, wherein the stator has a ring shape with an annular opening,
    wherein all permanent magnets of the FSPMM are magnetized in the same circumferential direction of the stator,
    wherein the stator comprises a plurality of slots,
    wherein each coil that is wrapped around a permanent magnet is disposed in a slot of the plurality of slots of the stator,
    wherein each coil directly faces the first rotor and the second rotor without a back-iron interposed therebetween,
    wherein each slot of the plurality of slots of the stator has a width configured to focus flux, from the permanent magnet around which the coil disposed in said slot is wrapped, across a first airgap separating the stator and the first rotor, wherein the width of each slot is larger than the first airgap, wherein the first airgap is a shortest radial distance between the stator and the first rotor, and wherein adjacent permanent magnets of the FSPMM are not connected via a yoke.

14. The method according to claim 13, wherein the second rotor has a ring shape with an annular opening, wherein providing the stator between the first rotor and the second rotor comprises disposing the first rotor within the annular opening of the stator and disposing the stator within the annular opening of the second rotor, wherein the first rotor and the second rotor each comprises rotor teeth facing the stator and teeth gaps between the rotor teeth, and wherein the second rotor is provided such that it is displaced from the first rotor by half a pole pitch such that the rotor teeth of the first rotor are aligned with the teeth gaps of the second rotor and the rotor teeth of the second rotor are aligned with the teeth gaps of the first rotor.

15. The method according to claim 13, further comprising:

encapsulating the stator, the permanent magnets, and the coils in a non-magnetic encapsulating material, prior to providing the stator between the first rotor and the second rotor, and magnetizing the permanent magnets such that all permanent magnets of the FSPMM are magnetized in the same circumferential direction of the stator, wherein magnetizing the permanent magnets is performed after encapsulating the stator, the permanent magnets, and the coils in the non-magnetic encapsulating material.

16. The method according to claim 13, wherein the width of each slot of the plurality of slots of the stator is also configured to focus flux, from the permanent magnet around which the coil disposed in said slot is wrapped, across a second airgap separating the stator and the second rotor, wherein the second airgap is a shortest radial distance between the stator and the second rotor, and wherein a smallest width of each slot of the plurality of slots of the stator is greater than both the first airgap and the second airgap.

17. A flux-switching machine (FSM), comprising:

a first rotor;

a second rotor; and a stator disposed between the first rotor and the second rotor, wherein the stator has a ring shape with an annular opening, wherein the stator comprises a plurality of DC field coil/permanent magnet hybrid combinations and a phase winding coil wrapped around each DC field coil/permanent magnet hybrid combination, wherein each DC field coil/permanent magnet hybrid combination comprises a DC field coil and a permanent magnet, and wherein all permanent magnets of the FSM are magnetized in the same circumferential direction, and wherein the phase winding coil directly faces the first rotor and the second rotor without a back-iron interposed therebetween, and wherein adjacent permanent magnets of the FSM are not connected via a yoke.

18. The FSM according to claim 17, wherein the first rotor is disposed within the annular opening of the stator, wherein the second rotor has a ring shape with an annular opening, wherein the stator is disposed within the annular opening of the second rotor, wherein the first rotor comprises rotor teeth on a surface thereof facing the stator, wherein the first rotor comprises teeth gaps between the rotor teeth of the first rotor, wherein the second rotor comprises rotor teeth on a surface thereof facing the stator, wherein the second rotor comprises teeth gaps between the rotor teeth of the second rotor, and wherein the first rotor and the second rotor are displaced from each other by half a pole pitch such that the rotor teeth of the first rotor are aligned with the teeth gaps of the second rotor and the rotor teeth of the second rotor are aligned with the teeth gaps of the first rotor.

* * * * *